United States Patent
Hillis et al.

(10) Patent No.: US 7,644,183 B2
(45) Date of Patent: Jan. 5, 2010

(54) ACCELERATED RECEPTION OF SPATIAL-TO-TEMPORAL TRANSLATED DATA

(75) Inventors: William D. Hillis, Encino, CA (US); Edward K. Y. Jung, Bellevue, WA (US); Nathan P. Myhrvold, West Medina, WA (US); Lowell L. Wood, Jr., Livermore, CA (US)

(73) Assignee: Searete, LLC, Bellevue, WA (US)

( * ) Notice: Subject to any disclaimer, the term of this patent is extended or adjusted under 35 U.S.C. 154(b) by 1018 days.

(21) Appl. No.: 10/734,650

(22) Filed: Dec. 11, 2003

(65) Prior Publication Data

US 2005/0144319 A1 Jun. 30, 2005

(51) Int. Cl.
G06F 15/16 (2006.01)

(52) U.S. Cl. ...................... 709/245; 709/219

(58) Field of Classification Search ................. 709/245, 709/219
See application file for complete search history.

(56) References Cited

U.S. PATENT DOCUMENTS

| | | | |
|---|---|---|---|
| 4,845,658 A | 7/1989 | Gifford | |
| 5,285,469 A | 2/1994 | Vanderpool | |
| 5,437,464 A | 8/1995 | Terasima et al. | |
| 5,461,711 A | 10/1995 | Wang et al. | |
| 5,486,929 A | 1/1996 | Heyl | |
| 5,600,777 A | 2/1997 | Wang et al. | |
| 5,644,786 A | 7/1997 | Gallagher et al. | |
| 5,644,789 A * | 7/1997 | Matthews et al. | 710/36 |
| 5,742,638 A | 4/1998 | Smith | |
| 5,787,076 A | 7/1998 | Anderson et al. | |
| 5,801,753 A | 9/1998 | Eyer et al. | |
| 5,920,701 A | 7/1999 | Miller et al. | |
| 5,926,649 A * | 7/1999 | Ma et al. | 710/6 |
| 5,938,734 A * | 8/1999 | Yao et al. | 709/232 |
| 5,956,321 A | 9/1999 | Yao et al. | |
| 6,049,891 A | 4/2000 | Inamoto | |
| 6,081,402 A | 6/2000 | Cho | |
| 6,345,028 B1 * | 2/2002 | Jaeger | 369/84 |
| 2002/0009070 A1 | 1/2002 | Lindsay et al. | |

(Continued)

FOREIGN PATENT DOCUMENTS

EP 0931388 B1 11/2003

OTHER PUBLICATIONS

PCT International Search Report; International App. No. PCT/US04/39879; Jan. 24, 2007.

(Continued)

*Primary Examiner*—Frantz B Jean

(57) ABSTRACT

In some embodiments, methods for reception of spatial-to-temporal translated data include obtaining one or more first-network temporal addresses and one or more second-network temporal addresses corresponding to at least one specific content in response to a request for data, applying the one or more first-network temporal addresses to receive a first part of the at least one specific content being transmitted from a first network while approximately at the same time applying the one or more second-network temporal addresses to receive a second part of the at least one specific content being transmitted from a second network, and constructing the at least one content from the first part of the at least one specific content being transmitted from the first network and the second part of the at least one specific content being transmitted from the second network.

80 Claims, 26 Drawing Sheets

U.S. PATENT DOCUMENTS

2003/0002864 A1    1/2003    Mollie et al.

OTHER PUBLICATIONS

PCT International Search Report; International App. No. PCT/US04/39880; Mar. 12, 2007.

PCT International Search Report; International App. No. PCT/US04/39877; pp. 1-3; Jun. 27, 2008.

PCT International Search Report; International App. No. PCT/US04/39878; pp. 1-2; Jul. 14, 2008.

Excerpts from IEEE 100: The Authoritative Dictionary of IEEE Standards Terms, Seventh Edition; bearing a date of Dec. 2000; pp. 590 and 1198 (total of 4 pages); The Institute of Electrical and Electronics Engineering Press (as provided by examiner).

US 5,987,079, 11/1999, Scott et al. (withdrawn)

* cited by examiner

Related Art

ACCELERATED RECEPTION OF SPATIAL-TO-TEMPORAL TRANSLATED DATA

CROSS-REFERENCE TO RELATED APPLICATIONS

The present application is related to, claims the earliest available effective filing date(s) from (e.g., claims earliest available priority dates for other than provisional patent applications; claims benefits under 35 USC § 119(e) for provisional patent applications), and incorporates by reference in its entirety all subject matter of the following listed applications; the present application also claims the earliest available effective filing date(s) from, and also incorporates by reference in its entirety all subject matter of any and all parent, grandparent, great-grandparent, etc. applications of the following listed applications:

1. U.S. patent application Ser. No. 10/734,659 entitled SPATIAL TO TEMPORAL DATA TRANSLATION AND SCHEDULING AND CONTROL, naming William D. Hillis, Edward K. Y. Jung; Nathan P. Myhrvold, and Lowell L. Wood Jr. as inventors, filed substantially contemporaneously herewith.

2. U.S. patent application Ser. No. 10/734,658 entitled SPATIAL TO TEMPORAL DATA TRANSLATION AND TRANSMISSION, naming William D. Hillis, Edward K. Y. Jung; Nathan P. Myhrvold, and Lowell L. Wood Jr. as inventors, filed substantially contemporaneously herewith.

3. U.S. patent application Ser. No. 10/734,647 entitled RECEPTION OF SPATIAL TO TEMPORAL TRANSLATED DATA, naming William D. Hillis, Edward K.Y. Jung; Nathan P. Myhrvold, and Lowell L. Wood Jr. as inventors, filed substantially contemporaneously herewith.

TECHNICAL FIELD

The present application relates, in general, to data storage, transmission, and/or reception.

SUMMARY

In one embodiment, a method includes but is not limited to receiving a request for data having at least one specific content; obtaining one or more first-network temporal addresses corresponding to the at least one specific content, in response to the request for data having the at least one specific content; obtaining one or more second-network temporal addresses corresponding to the at least one specific content, in response to the request for data having the at least one specific content; and constructing the at least one content from the first network and the second network.

In one embodiment of the method, the receiving a request for data having at least one specific content is characterized by receiving a request for at least a portion of recorded video.

In one embodiment of the method, the receiving a request for data having at least one specific content is characterized by receiving a request for at least a portion of recorded audio.

In one embodiment of the method, the receiving a request for data having at least one specific content is characterized by receiving a request for at least a portion of recorded audio and video.

In one embodiment of the method, the receiving a request for data having at least one specific content is characterized by receiving a request for at least a portion of at least one of computer processable and network processable data.

In one embodiment of the method, the obtaining one or more first-network temporal addresses corresponding to the at least one specific content, in response to the request for data having the at least one specific content is characterized by associating the specific content with one or more times of one or more first network transmitted data portions.

In one embodiment of the method, the associating the specific content with one or more times of one or more first network transmitted data portions is characterized by consulting a first-network schedule having the specific content in association with the one or more times of the one or more transmitted data portions.

In one embodiment of the method, the consulting a first-network schedule having the specific content in association with the one or more times of the one or more transmitted data portions is characterized by consulting a first-network schedule published by at least one of a first-network source controller and a first-network source switch controller.

In one embodiment of the method, the consulting a first-network schedule published by at least one of a first-network source controller and a first-network source switch controller is characterized by accepting input of the first-network schedule published by at least one of the first-network source controller and the first-network source switch controller.

In one embodiment of the method, the consulting a first-network schedule having the specific content in association with the one or more times of the one or more transmitted data portions is characterized by consulting a first-network schedule received from at least one of a first-network source controller and a first-network source switch controller.

In one embodiment of the method, the consulting a first-network schedule received from at least one of a first-network source controller and a first-network source switch controller is characterized by receiving the first-network schedule from a data stream.

In one embodiment of the method, the associating the specific content with one or more times of one or more first network transmitted data portions is characterized by associating the specific content with at least one absolute time associated with a clock.

In one embodiment of the method, the associating the specific content with at least one absolute time associated with a clock is characterized by associating the specific content with at least one absolute time associated with at least one of an atomic clock, a global clock, a relative clock, a transmitted clock, and a number of ticks relative to some specified received data.

In one embodiment of the method, the associating the specific content with at least one absolute time associated with a clock is characterized by associating the specific content with at least one absolute time associated with a transmitted clock.

In one embodiment of the method, the associating the specific content with one or more times of one or more first network transmitted data portions is characterized by associating the specific content with at least one relative time.

In one embodiment of the method, the associating the specific content with at least one relative time is characterized by associating the specific content with at least one time relative to a received marker.

In one embodiment of the method, the associating the specific content with at least one relative time is characterized by associating the specific content with at least one time of a first and a second received marker.

In one embodiment of the method, the obtaining one or more second-network temporal addresses corresponding to the at least one specific content, in response to the request for data having the at least one specific content is characterized by associating the specific content with one or more times of one or more second network transmitted data portions.

In one embodiment of the method, the associating the specific content with one or more times of one or more second network transmitted data portions is characterized by consulting a second-network schedule having the specific content in association with the one or more times of the one or more transmitted data portions.

In one embodiment of the method, the consulting a second-network schedule having the specific content in association with the one or more times of the one or more transmitted data portions is characterized by consulting a second-network schedule published by at least one of a second-network source controller and a second-network source switch controller.

In one embodiment of the method, the consulting a second-network schedule published by at least one of a second-network source controller and a second-network source switch controller is characterized by accepting input of the second-network schedule published by at least one of the second-network source controller and the second-network source switch controller.

In one embodiment of the method, the consulting a second-network schedule having the specific content in association with the one or more times of the one or more transmitted data portions is characterized by consulting a second-network schedule received from at least one of a second-network source controller and a second-network source switch controller.

In one embodiment of the method, the consulting a second-network schedule received from at least one of a second-network source controller and a second-network source switch is characterized by receiving the second-network schedule from a data stream.

In one embodiment of the method, the associating the specific content with one or more times of one or more second network transmitted data portions is characterized by associating the specific content with at least one absolute time associated with a clock.

In one embodiment of the method, the associating the specific content with at least one absolute time associated with a clock is characterized by associating the specific content with at least one time associated with at least one of an atomic clock, a global clock, a relative clock, a transmitted clock, and a number of ticks relative to some specified received data.

In one embodiment of the method, the associating the specific content with at least one absolute time associated with a clock is characterized by associating the specific content with at least one absolute time associated with a transmitted clock.

In one embodiment of the method, the associating the specific content with one or more times of one or more second network transmitted data portions is characterized by associating the specific content with at least one relative time.

In one embodiment of the method, the associating the specific content with at least one relative time is characterized by associating the specific content with at least one time relative to a received marker.

In one embodiment of the method, the associating the specific content with at least one relative time is characterized by associating the specific content with at least one time of a first and a second received marker.

In one embodiment of the method, the constructing the at least one content from the first network and the second network is characterized by agglomerating a portion of the at least one content received from the first network with a portion of the at least one content received from the second network.

In one embodiment of the method, the constructing the at least one content from the first network and the second network is characterized by interleaving a portion of the at least one content received from the first network with a portion of the at least one content received from the second network.

In one embodiment of the method, the constructing the at least one content from the first network and the second network is characterized by selecting data from at least one data stream having file-address-to-temporal-address translated data.

In one embodiment of the method, the constructing the at least one content from the first network and the second network is characterized by selecting data from at least one data stream having disk-address-to-temporal-address translated data.

In one embodiment of the method, the constructing the at least one content from the first network and the second network is characterized by selecting data from at least one data stream having tape-address-to-temporal-address translated data.

In one embodiment of the method, the constructing the at least one content from the first network and the second network is characterized by selecting data from at least one data stream having substantially static memory-address-to-temporal-address translated data.

In one embodiment of the method, the constructing the at least one content from the first network and the second network is characterized by selecting data from at least one data stream having object-address-to-temporal-address translated data.

In one or more various embodiments, related systems include but are not limited to circuitry and/or programming for effecting the method embodiments described in the text and/or drawings of the present application; the circuitry and/or programming can be virtually any combination of hardware, software, and/or firmware configured to effect the foregoing-referenced method embodiments depending upon the design choices of the system designer.

In one embodiment, a system includes but is not limited to a temporal address unit configured to receive a request for a substance of data; and a data switch controller configured to generate one or more first-network temporal addresses and second-network temporal addresses in response to the request for the substance.

In one embodiment of the system, the temporal address unit configured to receive a request for a substance of data is characterized by a spatial-to-temporal address converter configured to receive a request for data in a spatial format.

In one embodiment of the system, the spatial-to-temporal address converter configured to receive a request for data in a spatial format is characterized by a spatial-to-temporal address converter configured to receive a request for data in a spatial address device format.

In one embodiment of the system, the temporal address unit configured to receive a request for a substance of data is characterized by a content-to-temporal address converter configured to receive a request for data in a content format.

In one embodiment of the system, the content-to-temporal address converter configured to receive a request for data in a content format is characterized by a content-to-temporal address converter configured to receive a request for at least a part of recorded video.

In one embodiment of the system, the content-to-temporal address converter configured to receive a request for data in a content format is characterized by a content-to-temporal address converter configured to receive a request for at least a part of recorded audio.

In one embodiment of the system, the content-to-temporal address converter configured to receive a request for data in a content format is characterized by a content-to-temporal address converter configured to receive a request for at least a part of recorded audio and video.

In one embodiment of the system, the data switch controller configured to generate one or more first-network temporal addresses and second-network temporal addresses in response to the request for the substance is characterized by the data switch controller configured to access a first-network content transmission schedule and a second-network content transmission schedule.

Various other method and or system embodiments are set forth and described in the text (e.g., claims and/or detailed description) and/or drawings of the present application.

The foregoing is a summary and thus contains, by necessity; simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined solely by the claims, will become apparent in the non-limiting detailed description set forth herein.

BRIEF DESCRIPTION OF THE FIGURES

The use of the same or similar symbols in different drawings typically indicates similar or identical items.

DETAILED DESCRIPTION

The text (e.g., claims and/or detailed description) and/or drawings set forth herein support various different applications. Although, for sake of convenience of understanding, the detailed description includes section headings that generally track the titles of the various different supported applications, it is to be understood that support for the various applications appears throughout the text and/or drawings, irrespective of the section headings.

I. Environment

Figure 1:
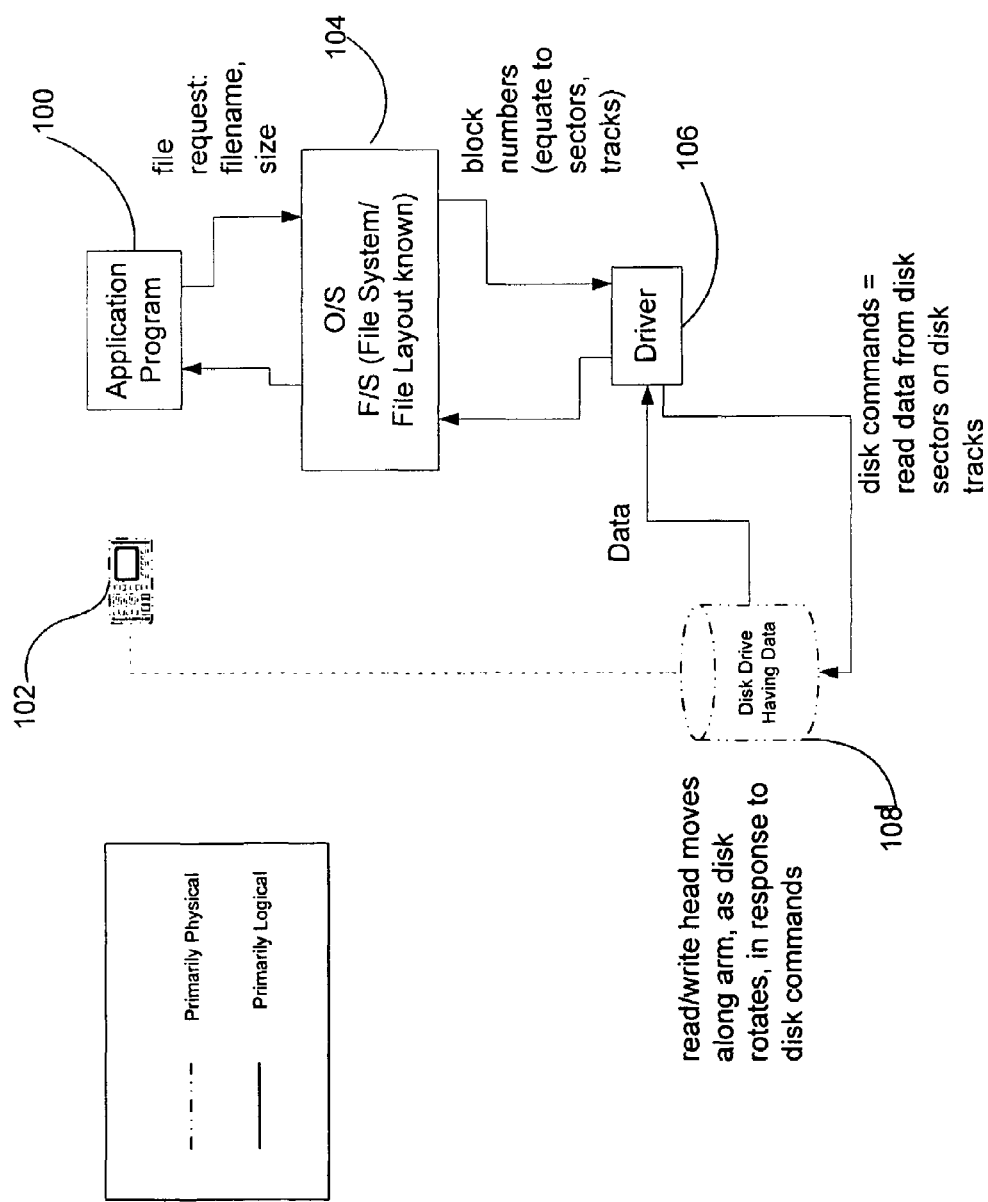
FIG. 1 shows a representation of a related-art environment.

With reference to the figures, and with reference now to FIG. 1, shown is a representation of a related-art environment. Application program 100 is depicted as resident within data processing system 102. Application program 100 is illustrated as issuing a read file command to operating system 104. In response to the read file command, operating system 104 is shown as issuing read data block commands to device driver 106.

Figure 2:
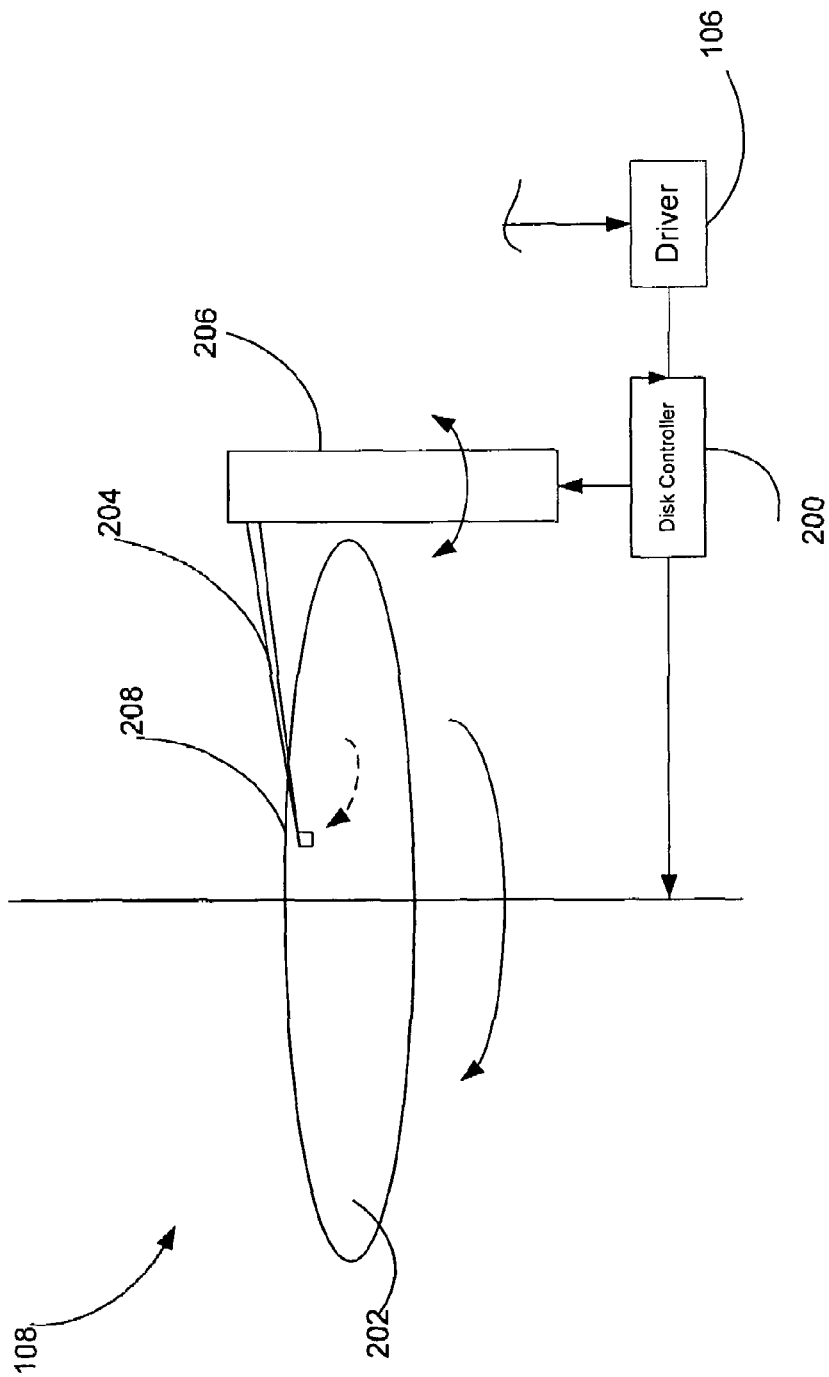
FIG. 2 depicts a perspective view of portions of related-art disk drive 108 (FIG. 1).

Device driver 106 is depicted as issuing read disk commands to a disk controller (FIG. 2) of disk drive 108. In response to the read disk commands, the disk controller of disk drive 108 is illustrated as causing a disk platter to spin and a read head on a swing arm to move over the appropriate tracks and sectors in order to read the commanded data (FIG. 2). Once the disk controller has read the commanded data from appropriate disk tracks and disk sectors, the disk controller of disk drive 108 is shown as sending the read data to device driver 106.

Subsequent to receiving the data from disk drive 108, device driver 106 is depicted as formulating and transmitting the read data in a format appropriate to operating system 104. Subsequent to receiving the data from hard disk drive 108, operating system 104 is illustrated as formulating and transmitting the read data to application program 100.

Referring now to FIG. 2, depicted is a perspective view of portions of related-art disk drive 108 (FIG. 1). In response to disk commands, disk controller 200 is shown as causing disk platter 202 to spin and swing arm 204 to pivot about pivot structure 206. Disk controller 200 is depicted as pivoting swing arm 204 as appropriate so that disk head 208 moves over the sectors and tracks used to satisfy the disk commands received by disk controller 200 from device driver 106 (FIG. 1). The other components shown in FIG. 2 function in a fashion similar to analogous components as described elsewhere herein.

The inventors have noticed that in order for disk controller 200 to satisfy file commands generated by application program 100, it is common for the disk controller 200 to move disk head 208 through many spatial locations relative to the surface of disk platter 202. For example, it is common for disk controller 200 to repetitively move disk head 208 between various outer and inner tracks and sectors in order to satisfy file commands generated by application program 100. Because the file commands are satisfied by disk commands directing that disk controller 200 move disk head 208 through space, the inventors refer to disk drive 108 as a spatial address device. However, a spatial address system is not limited to the foregoing. Other examples of spatial address systems are tape drive systems, disk drive systems, network systems, substantially static memory systems (e.g. random access memory systems, read only memory systems, flash memory systems, etc), object memory systems, and emulators of one or more of the foregoing described systems (e.g., RAM Disk, Disk Cache, and Disk Emulation systems).

The inventors have devised methods and systems that can satisfy file commands generated by an application program by using a temporal address scheme. There are several advantages associated with these methods and schemes, a few of which will be shown and described following.

Figure 3:
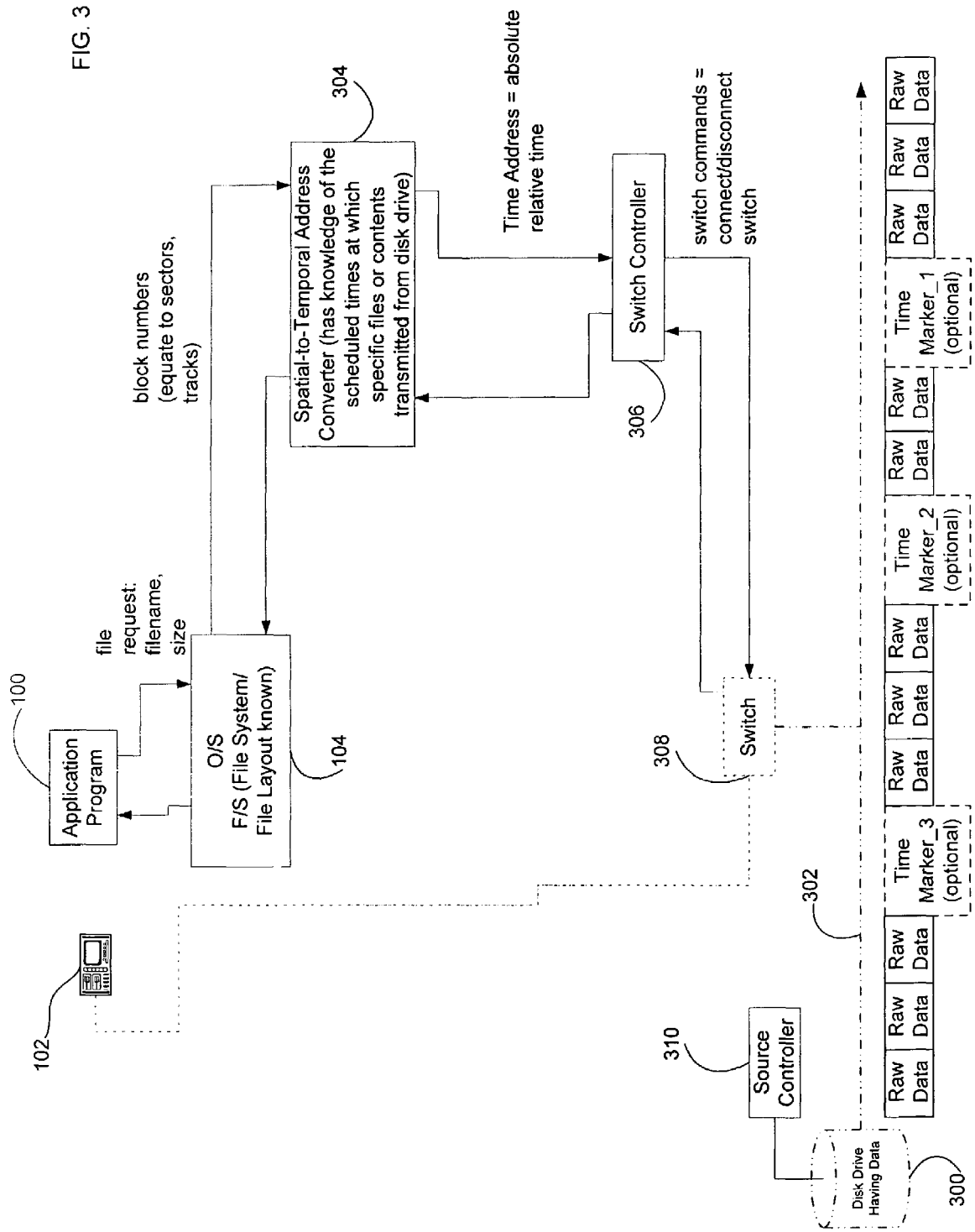
FIG. 3 illustrates a block diagram of a spatial-to-temporal address translation method and system.
Figure 17:
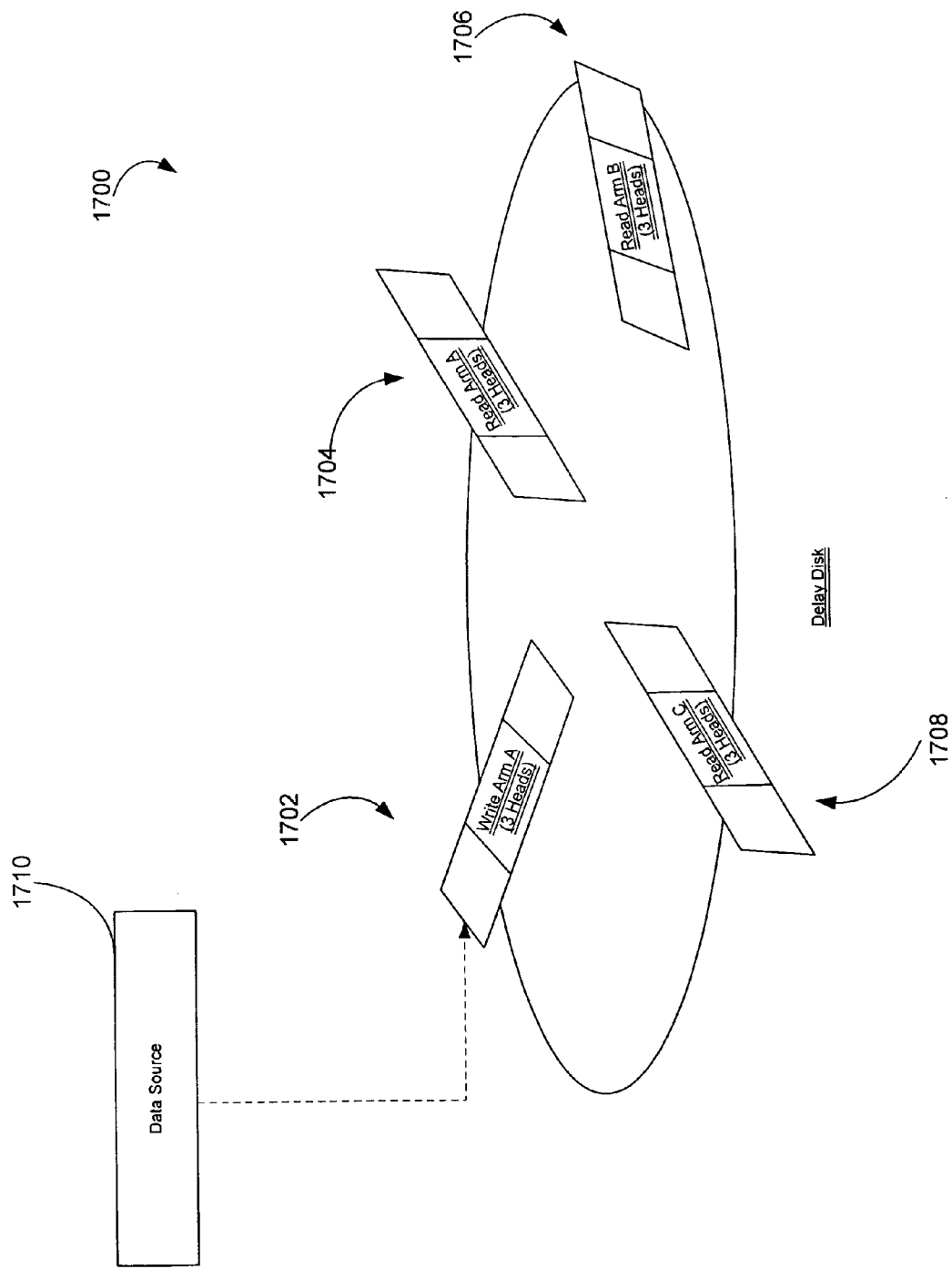
FIG. 17 shows a partially schematic diagram of delay-reclocking disk 1700.

II. Reception of Spatial-to-Temporal Translated Data and Related Devices and Processes With reference now to FIG. 3, illustrated is a block diagram of a spatial-to-temporal address translation method and system. Disk drive 300 is shown reading data from disk drive 300 and transmitting the read data onto communications media 302 in a predetermined fashion. The inventors have devised many ways in which such reading and transmission may be implemented. In one implementation, a related-art disk drive is configured such that it sequentially reads and transmits all the tracks on a disk in a relatively continuous loop. In another implementation, a hard disk drive has a stationary arm with multiple attached disk heads, some of which are dedicated to particular disk tracks; electronic switching is used to read the tracks (FIG. 17).

Application program 100 is depicted as resident within data processing system 102. Application program 100 is illustrated as issuing a read file command to operating system 104. In response to the read file command, operating system 104 is shown as issuing read data block commands to spatial-to-temporal address converter 304.

In response to the read data block commands, spatial-to-temporal address converter 304 is depicted as converting the data block addresses into time addresses, and transmitting time addresses to switch controller 306. Spatial-to-temporal address converter 304 converts the data block commands to associated time addresses that indicate when data necessary to satisfy the read data block commands should be present at the input of switch 308. Spatial-to-temporal address converter 304 can perform the conversion efficiently because spatial-to-temporal address converter 304 has knowledge of and thus can consult the scheduled times at which disk drive 300 transmits specific content onto communications medium 302 (examples showing how address converter 304 can gain this knowledge from source controller 310 are discussed herein). In one implementation, the time addresses are absolute (e.g., referenced against time associated with at least one of an atomic clock, a global clock, a relative clock, a transmitted clock, and a number of ticks relative to some specified received data). In another implementation, the time addresses are relative (e.g., relative to one or more time markers such as those shown in the stream of data on communications media 302, relative to known starting and stopping times of a "loop" of data continuously transmitted by disk drive 300, or relative to another appropriate referent.). In other alternate implementations, the time stamps of various packets of data can be used to provide temporal addressing; in some instances, these time stamps will have been created for purposes other than temporal addressing, while in other instances, the time stamps will be expressly created for the purpose of temporal addressing. In yet other alternate implementations, formal packets are not used, and raw data is switched based on time, without the use of any particular patent headers. That is, the present subject matter contemplates both packet-based and non-packet based implementations of methods and/or systems.

In response to the time addresses received from spatial-to-temporal address converter 304, switch controller 306 is illustrated as issuing connect or disconnect commands to switch 308. In response to the connect and/or disconnect commands, switch 308 is shown as appropriately connecting with or disconnecting from communications medium 302. In one embodiment, when switch 308 is connected with communications medium 302, switch controller 306 receives the data obtained by switch 308.

Subsequent to receiving the data from switch 308, switch controller 306 is depicted as formulating and transmitting the data read in a format appropriate to spatial-to-temporal address converter 304. Subsequent to receiving the data from switch controller 306, spatial-to-temporal address converter 304 is illustrated as formulating and transmitting the read data in a format appropriate to operating system 104. Operating system 104 then functions as described elsewhere herein. The other components shown in FIG. 3 function in a fashion similar to analogous components as described elsewhere herein.

Figure 4:
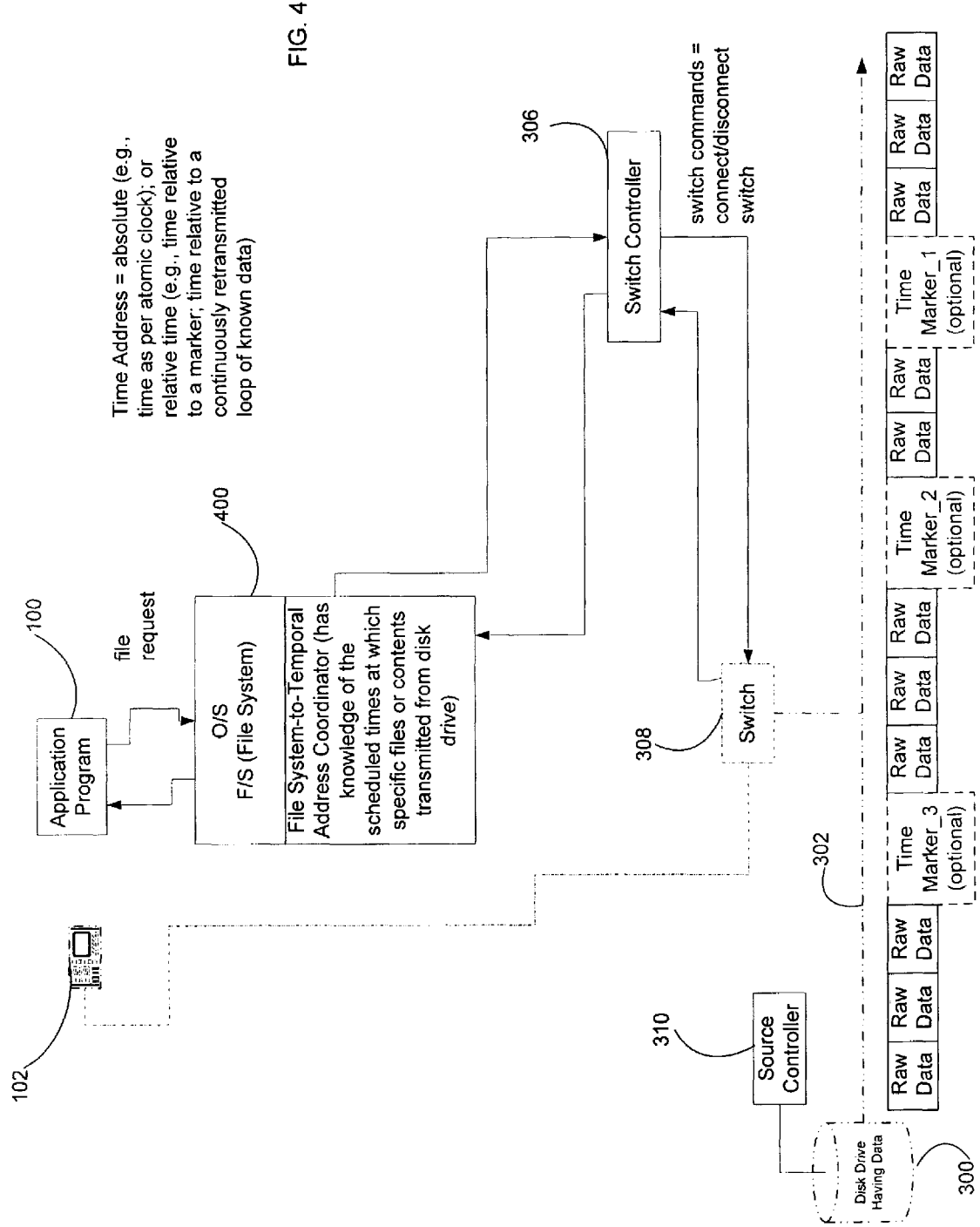
FIG. 4 shows a block diagram illustrating a spatial-to-temporal address translation method and system.

Referring now to FIG. 4, shown is a block diagram illustrating a spatial-to-temporal address translation method and system. The method and system shown in FIG. 4 are similar to those of FIG. 3, except that in FIG. 4 operating system 400 is shown as having file system-to-temporal address coordinator 402. File system-to-temporal address coordinator 402 has knowledge of the scheduled times at which disk drive 300 transmits specific content onto communications medium 302, and thus provides operating system 400 with the ability to receive a read file command and coordinate the read file command with the appropriate time addresses necessary to satisfy the file command. Operating system 400 then transmits the time addresses to switch controller 306.

In response to the time addresses, switch controller 306 is depicted as controlling switch 308 to connect and disconnect from communications medium 302 (e.g., at the times appropriate in order to read the data necessary to satisfy the file commands originally issued by application program 100). The data of switch 308 is received by switch controller 306. Subsequent to receiving the data from switch 308, switch controller 306 is illustrated as formulating and transmitting the read data in a format appropriate to operating system 400. Operating system 400 is shown as formulating and transmitting the read data in a format appropriate to application program 100. The other components shown in FIG. 4 function in a fashion similar to analogous components as described elsewhere herein.

III. Transmission of Spatial-to-Temporal Translated Data and Related Devices and Processes Following are a series of flowcharts depicting embodiments of processes. For ease of understanding, the flowcharts are organized such that the initial flowcharts present embodiments via an overall "big picture" viewpoint and thereafter the following flowcharts present alternate embodiments and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and efficient understanding of the various process instances.

Figure 5:
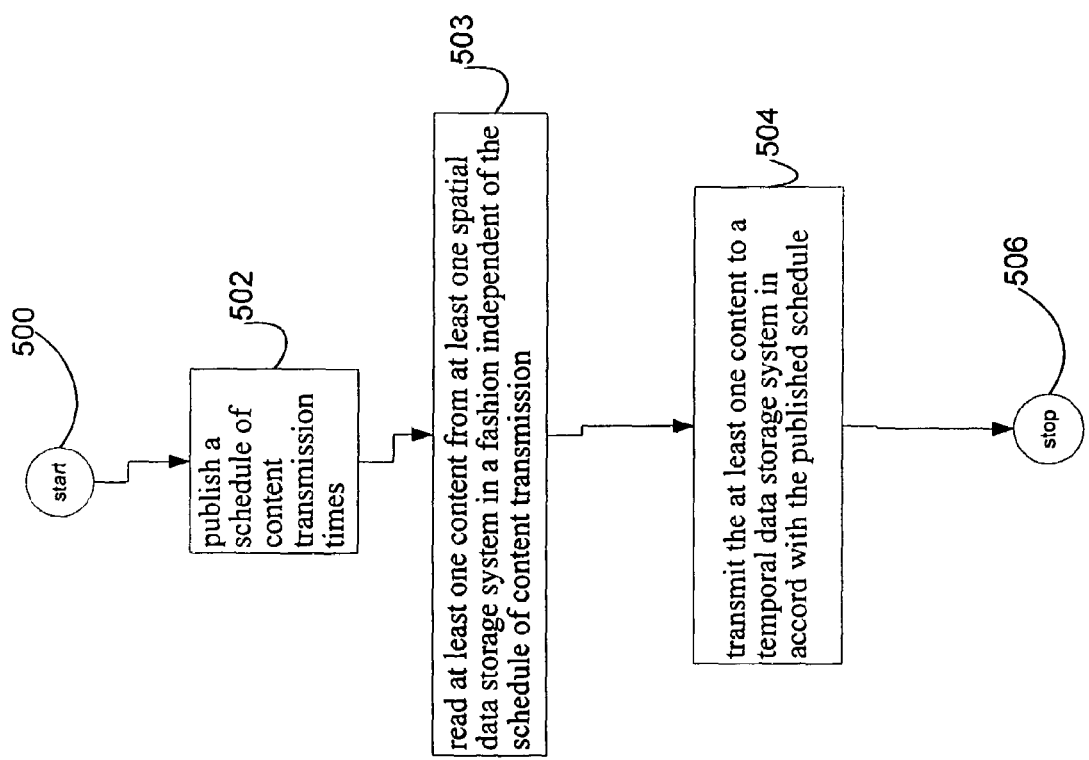
FIG. 5 depicts a high-level logic flowchart of a process.

With reference now to FIG. 5, depicted is a high level logic flowchart of a process. Method step 500 shows the start of the process. Method step 502 depicts publishing a schedule of content transmission times. Method step 503 shows reading at least one content from at least one spatial data storage system in a fashion independent of the schedule of content transmission times. Method step 504 illustrates transmitting the at least one content to a temporal data storage system in accord with the published schedule. Method step 506 shows the end of the process. Specific example implementations of the more general process implementations of FIG. 5 are described following.

Figure 6:
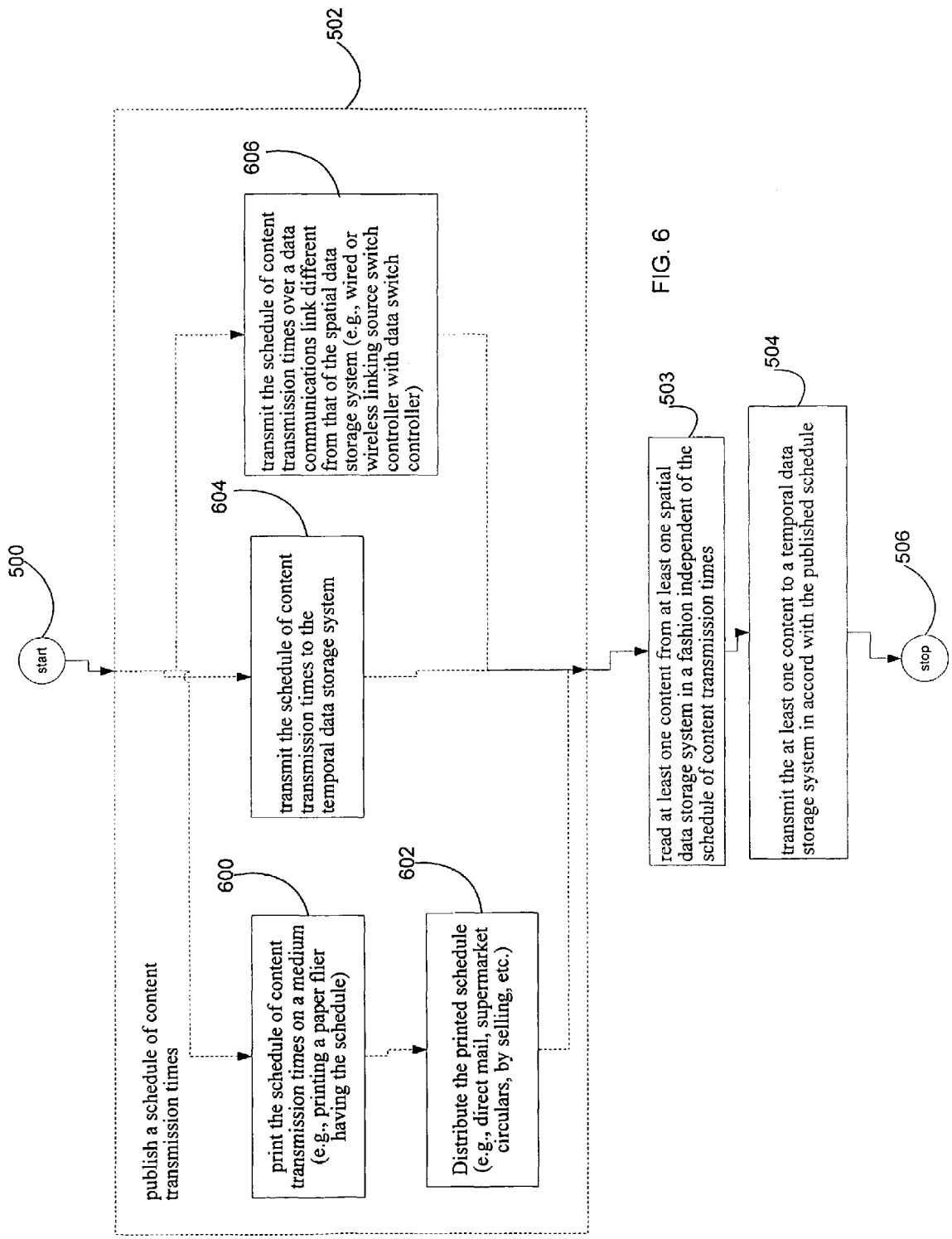
FIG. 6 illustrates a high-level logic flowchart depicting several alternate embodiments of the high-level logic flowchart of FIG. 5.

Referring now to FIG. 6, illustrated is a high-level logic flowchart depicting several alternate embodiments of the high-level logic flowchart of FIG. 5. Depicted is that in one alternate embodiment method step 502 includes method steps 600 and 602. Method step 600 shows printing the schedule of content transmission times on a medium. In one implementation, a paper flier having a list of contents and associated times of transmission of such contents are printed. For example, printing a page containing the information "Joe Smith's echocardiogram will be transmitted at times T1, T8, T30, etc." Method step 602 depicts distributing the printed schedule. The manner of distribution can vary dependent upon content. For example, in one implementation, the distribution is accomplished by direct mail of the printed schedule (e.g., for medical content); in another, by giving away, at supermarkets, schedules having the printed schedule (e.g., for entertainment content); in yet another, by selling the printed schedules through various outlets, etc.

FIG. 6 also shows that in another alternate embodiment method step 502 includes method 604. Method step 604 illustrates transmitting the schedule of content transmission times to the temporal data storage system. For example, transmitting a schedule, at predetermined intervals of time, onto a transmission medium. In one implementation, a schedule is transmitted at predetermined times referenced against an atomic clock; in another, a schedule is transmitted at predetermined times referenced against a marker transmitted in the data stream; in another, a schedule is transmitted at predetermined times referenced against an event of the data stream (e.g., an event might be a first marker received after a second marker).

FIG. 6 also shows that in another alternate embodiment method step 502 includes method 606. Method step 606 depicts transmitting the schedule of content transmission times over a data communications link different from that of the spatial data storage system. For example, transmitting the schedule over a wired or wireless pathway linking a source controller with a data switch controller, wherein the wired or wireless pathway is different from any wired or wireless pathways whereby content data is transmitted between a data source and a data switch.

Figure 7:
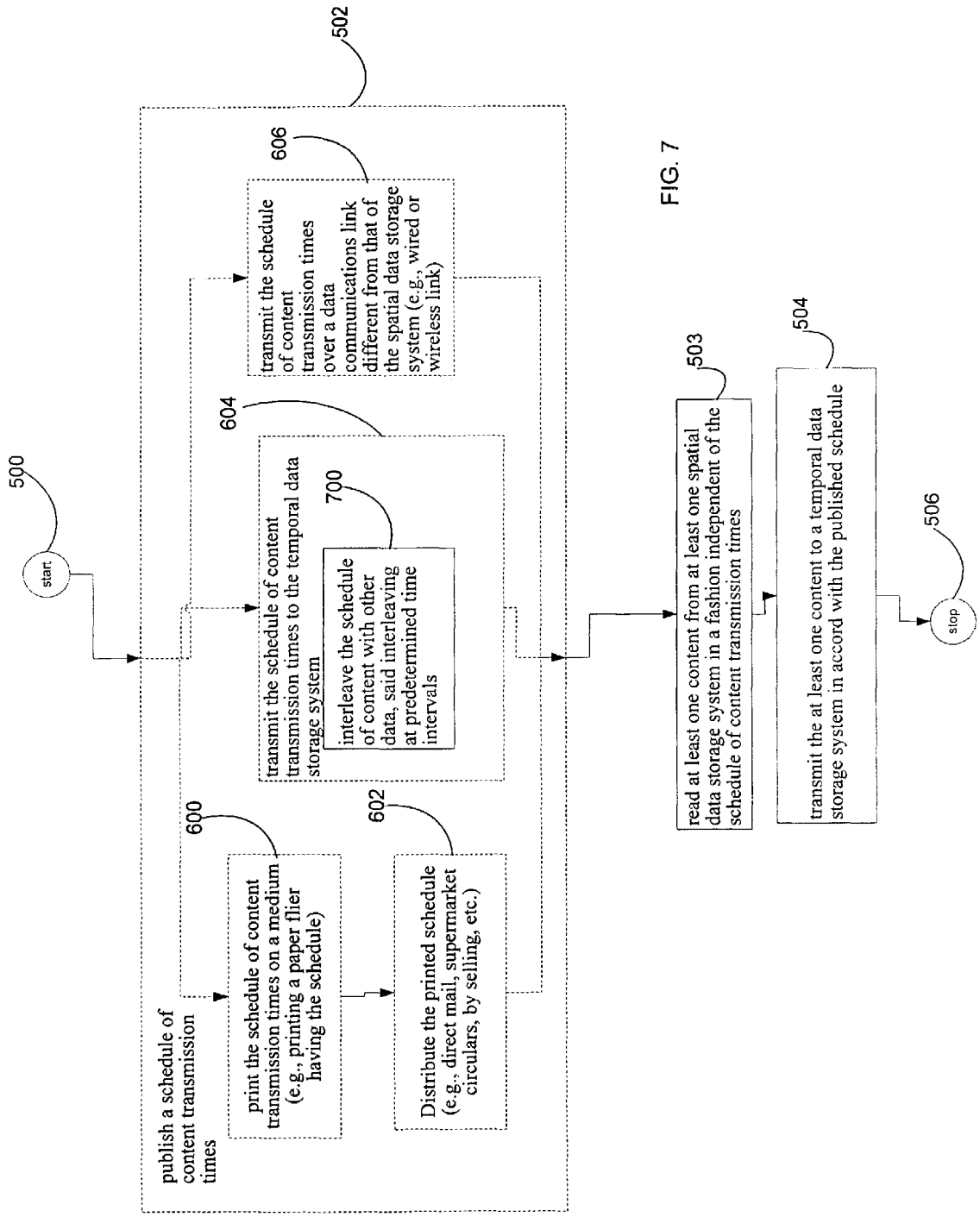
FIG. 7 shows a high-level logic flowchart depicting an alternate embodiment of the high-level logic flowchart of FIG. 6.

With reference now to FIG. 7, shown is a high-level logic flowchart depicting an alternate embodiment of the high-level logic flowchart of FIG. 6. Depicted is that in one alternate embodiment method step 604 includes method step 700. Method step 700 shows interleaving the schedule of content transmission times with other data, said interleaving at predetermined time intervals. For example transmitting the schedule over a wired or wireless pathway whereby content data is transmitted between a data source and a data switch, where the schedule is interleaved with the content data at predetermined time intervals relative to some clock, marker, or event. In addition, in some instances the schedule is interleaved with the content data and is detected by the presence of a bit pattern indicative of the schedule.

The present application describes publishing a schedule. It is to be understood that in various contemplated implementations, publishing the schedule is meant to include directly publishing and indirectly publishing the schedule. In one implementation, indirectly publishing the schedule includes transmitting one or more schedule determination algorithms or data for use in selected algorithms to one or more potential users (e.g., temporal address units 900 of FIG. 9) of the content. Thereafter, such potential users can use the information identified by the algorithms (such as a list of content of a hard drive)—which may itself also be transmitted to the potential users—to determine the schedule, which may thereafter be utilized as described elsewhere herein. Thus, publishing a schedule, as used herein, encompasses both direct and indirect publication of the schedule. Examples of directly publishing the schedule are set forth elsewhere herein.

The present application describes and/or implies various entities consulting and/or having knowledge of a schedule. It is to be understood that in various contemplated implementations, consulting and/or having knowledge of a schedule is meant to include calculating or otherwise determining the schedule, as well as having the schedule in storage. In one implementation, such consultation and/or knowledge is based on a scheduling algorithm. Thereafter, potential users of the schedule can utilize the schedule as described elsewhere herein. Other examples of consultation and/or having knowledge of a schedule are set forth elsewhere herein.

The present application describes and/or implies various examples of schedules having specific content in association with the one or more times of one or more transmitted data portions. Examples of such schedules include direct schedules such as lists, tables, look-up tables, data containers. Examples of such schedules also include indirect schedules includes pointers to lists, tables, look-up tables, and data containers.

Figure 23:
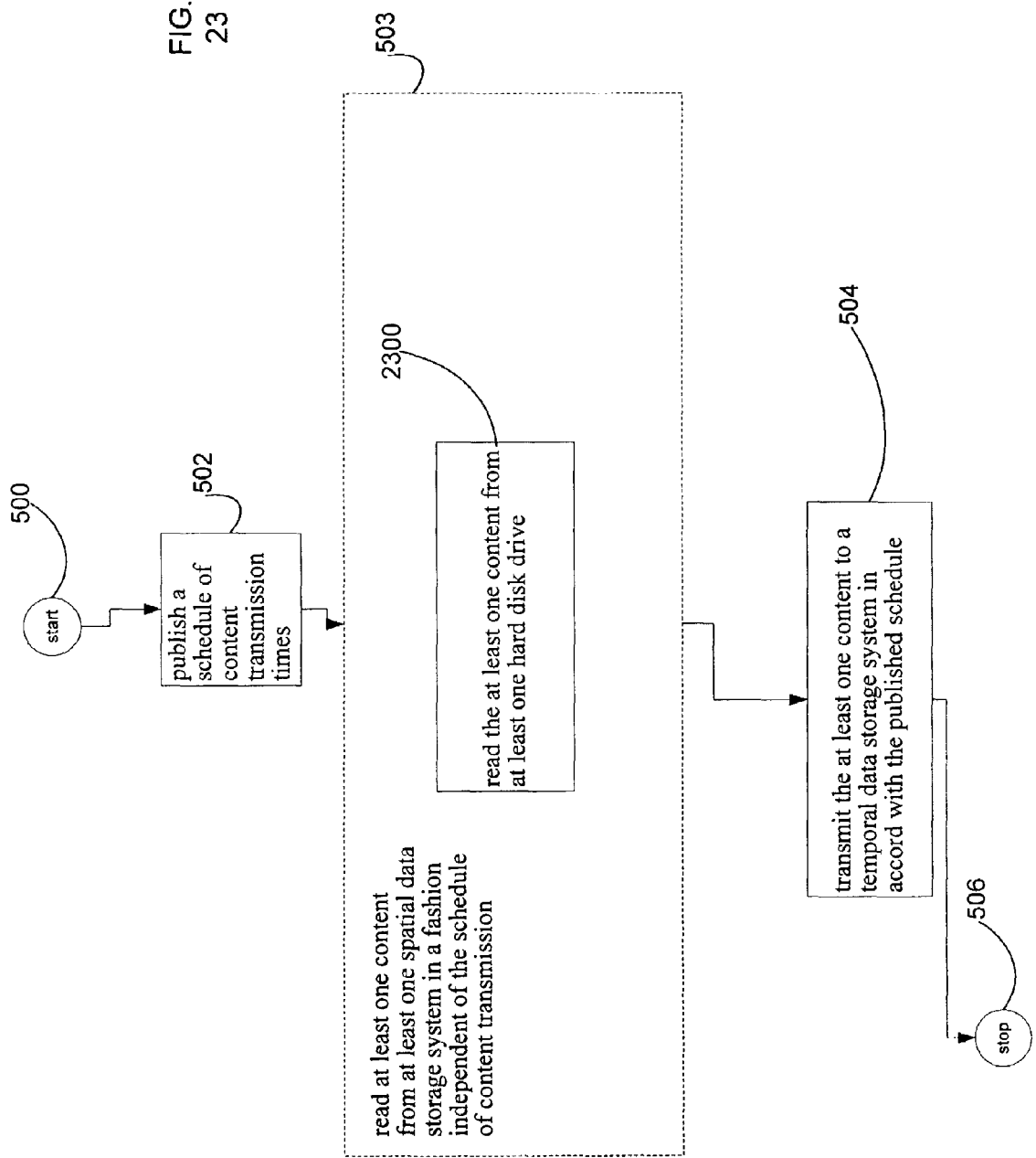
FIG. 23 shows a high-level logic flowchart depicting an alternate embodiment of the high-level logic flowchart of FIG. 5.

With reference now to FIG. 23, shown is a high-level logic flowchart depicting an alternate embodiment of the high-level logic flowchart of FIG. 5. Depicted is that in one alternate embodiment method step 503 includes method step 2300. Method step 2300 shows reading the at least one content from at least one hard disk drive. For example, reading two movies that have been sequentially stored on a hard disk drive. As another example, sequentially reading two movies that have been stored on a hard disk drive.

Figure 24:
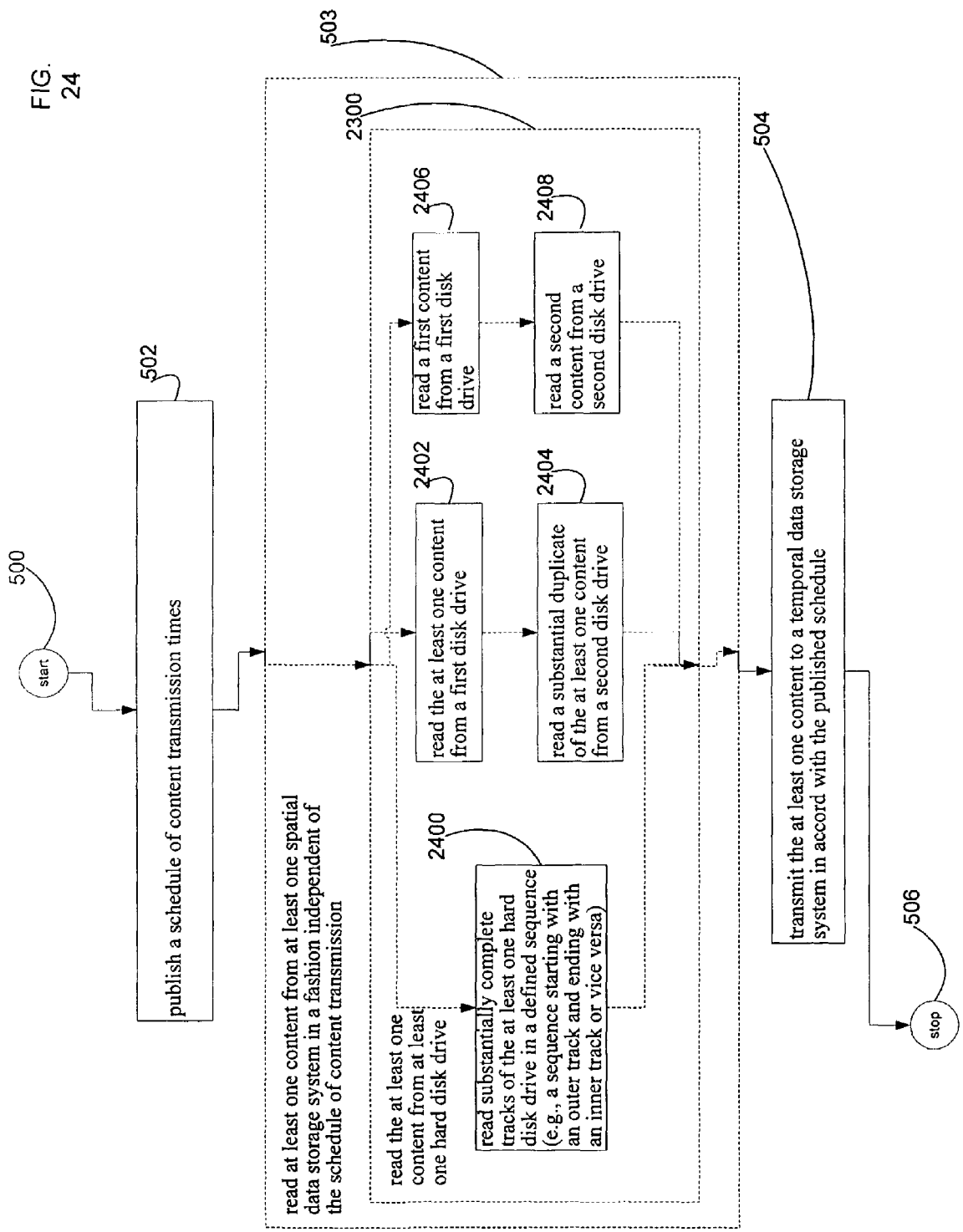
FIG. 24 illustrates a high-level logic flowchart depicting several alternate embodiments of the high-level logic flowchart of FIG. 23.

Referring now to FIG. 24, illustrated is a high-level logic flowchart depicting several alternate embodiments of the high-level logic flowchart of FIG. 23. Depicted is that in one alternate embodiment method step 2300 includes method step 2400. Method step 2400 illustrates reading substantially complete tracks of the at least one hard disk drive in a defined sequence (e.g., a sequence starting with an outer track and ending with an inner track or vice versa). For example, reading a hard disk drive containing several movies in a sequence from outmost complete track to innermost complete track, and then repeating. As another example, reading a hard disk drive containing several movies in a sequence from innermost complete track to outermost complete track, and then repeating.

FIG. 24 also shows that in another alternate embodiment method step 2300 includes method steps 2402 and 2404. Method step 2400 shows reading the at least one content from a first disk drive. In one implementation, a movie is read from a first hard drive. Method step 2404 depicts reading a substantial duplicate of the at least one content from a second disk drive. For example, reading the same move from a second hard drive in a slightly delayed fashion relative to the same movie being read from the first hard drive.

FIG. 24 also shows that in another alternate embodiment method step 503 includes method steps 2406 and 2408. Method step 2406 depicts reading a first content from a first disk drive. For example, reading a first movie from a first disk drive. Method step 2408 depicts reading a second content from a second disk drive. For example, reading a second movie from a second disk drive.

Figure 25:
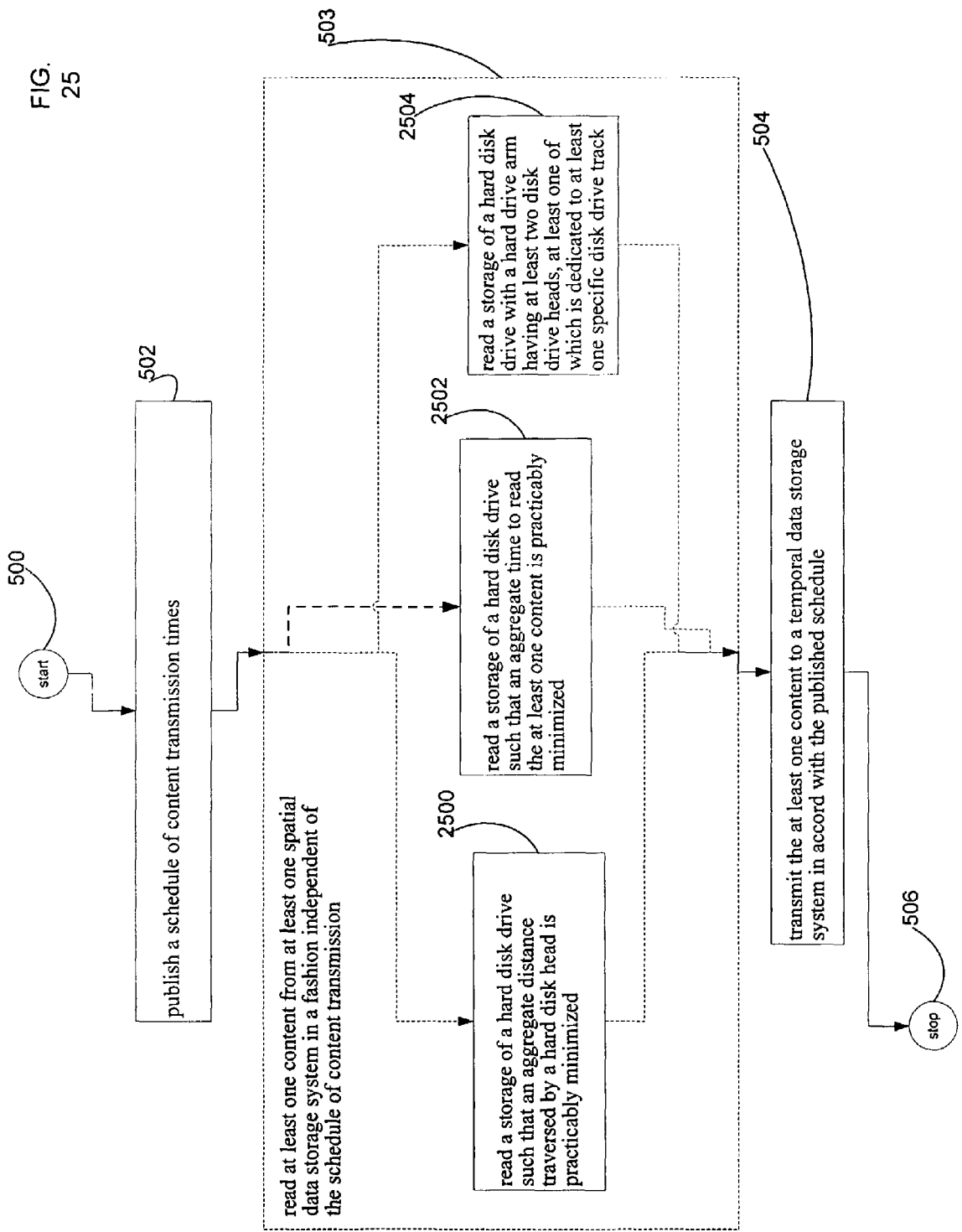
FIG. 25 illustrates a high-level logic flowchart depicting alternate embodiments of the high-level logic flowchart of FIG. 5.

Referring now to FIG. 25, illustrated is a high-level logic flowchart depicting alternate embodiments of the high-level logic flowchart of FIG. 5. Depicted is that in one alternate embodiment method step 503 alternately includes method step 2500. Method step 2500 illustrates reading a storage of a hard disk drive such that an aggregate distance traversed by a hard disk head is practicably minimized. Method step 2502 shows reading a storage of a hard disk drive such that an aggregate time to read the at least one content is practicably minimized. Method step 2504 shows reading a storage of a hard disk drive with a hard drive arm having at least two disk drive heads, at least one of which is dedicated to at least one specific disk drive track.

Figure 26:
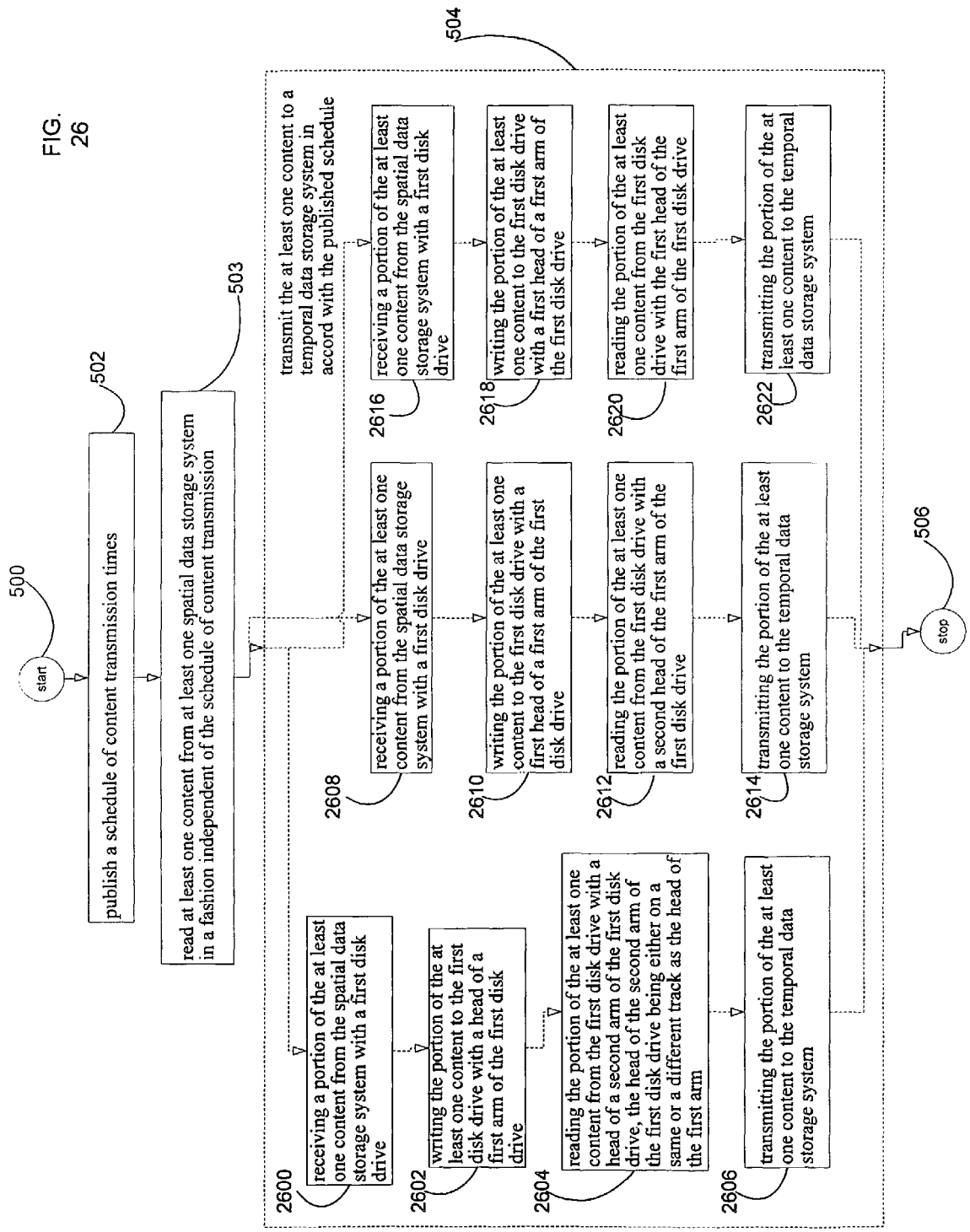
FIG. 26 illustrates a high-level logic flowchart depicting several alternate embodiments of the high-level logic flowchart of FIG. 5.

Referring now to FIG. 26, illustrated is a high-level logic flowchart depicting several alternate embodiments of the high-level logic flowchart of FIG. 5. Depicted is that in one alternate embodiment, method step 504 alternately includes method steps 2600, 2602, 2604, and 2606. Method step 2600 illustrates receiving a portion of the at least one content from the spatial data storage system with a first disk drive. Method step 2602 shows writing the portion of the at least one content to the first disk drive with a head of a first arm of the first disk drive. Method step 2604 shows reading the portion of the at least one content from the first disk drive with a head of a second arm of the first disk drive, the head of the second arm of the first disk drive being either on a same or a different track as the head of the first arm. Method step 2606 illustrates transmitting the portion of the at least one content to the temporal data storage system.

Depicted is that in one alternate embodiment method step 504 alternately includes method steps 2608, 2610, 2612, and 2614. Method step 2608 illustrates receiving a portion of the at least one content from the spatial data storage system with a first disk drive. Method step 2610 shows writing the portion of the at least one content to the first disk drive with a head of a first arm of the first disk drive. Method step 2612 shows reading the portion of the at least one content from the first disk drive with a second head of the first arm of the first disk drive. Method step 2614 illustrates transmitting the portion of the at least one content to the temporal data storage system.

Depicted is that in one alternate embodiment method step 504 alternately includes method steps 2616, 2618, 2620, and 2622. Method step 2616 illustrates receiving a portion of the at least one content from the spatial data storage system with a first disk drive. Method step 2618 shows writing the portion of the at least one content to the first disk drive with a head of a first arm of the first disk drive. Method step 2620 shows reading the portion of the at least one content from the first disk drive with the first head of the first arm of the first disk drive. Method step 2622 illustrates transmitting the portion of the at least one content to the temporal data storage system.

Figure 8:
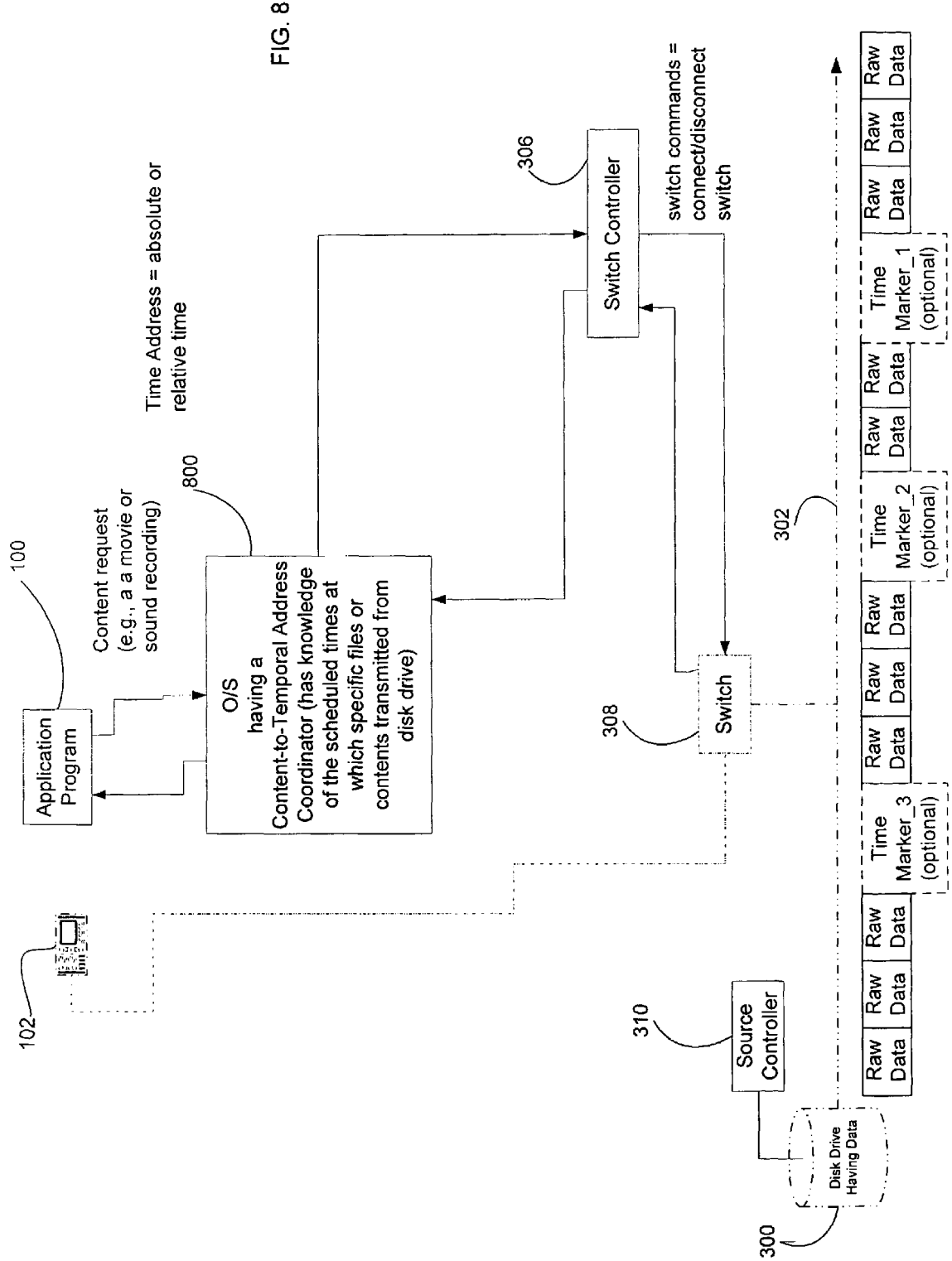
FIG. 8 depicts a block diagram illustrating a spatial-to-temporal address translation method and system.

Referring now to FIG. 8, depicted is a block diagram illustrating a spatial-to-temporal address translation method and system. The method and system shown in FIG. 8 are similar to those of FIGS. 2 and 3, except that in FIG. 8 operating system 800 is shown having a content-to-temporal address coordinator. The content-to-temporal address coordinator has knowledge of the scheduled times at which disk drive 300 transmits specific content onto communications medium 302, and thus provides operating system 800 with the ability to receive a content request (e.g., retrieve a certain movie) and coordinate the content request with the appropriate time addresses. Operating system 800 is depicted as transmitting the time addresses to switch controller 306. The other components shown in FIG. 8 function in a fashion similar to analogous components as described elsewhere herein.

Figure 9:
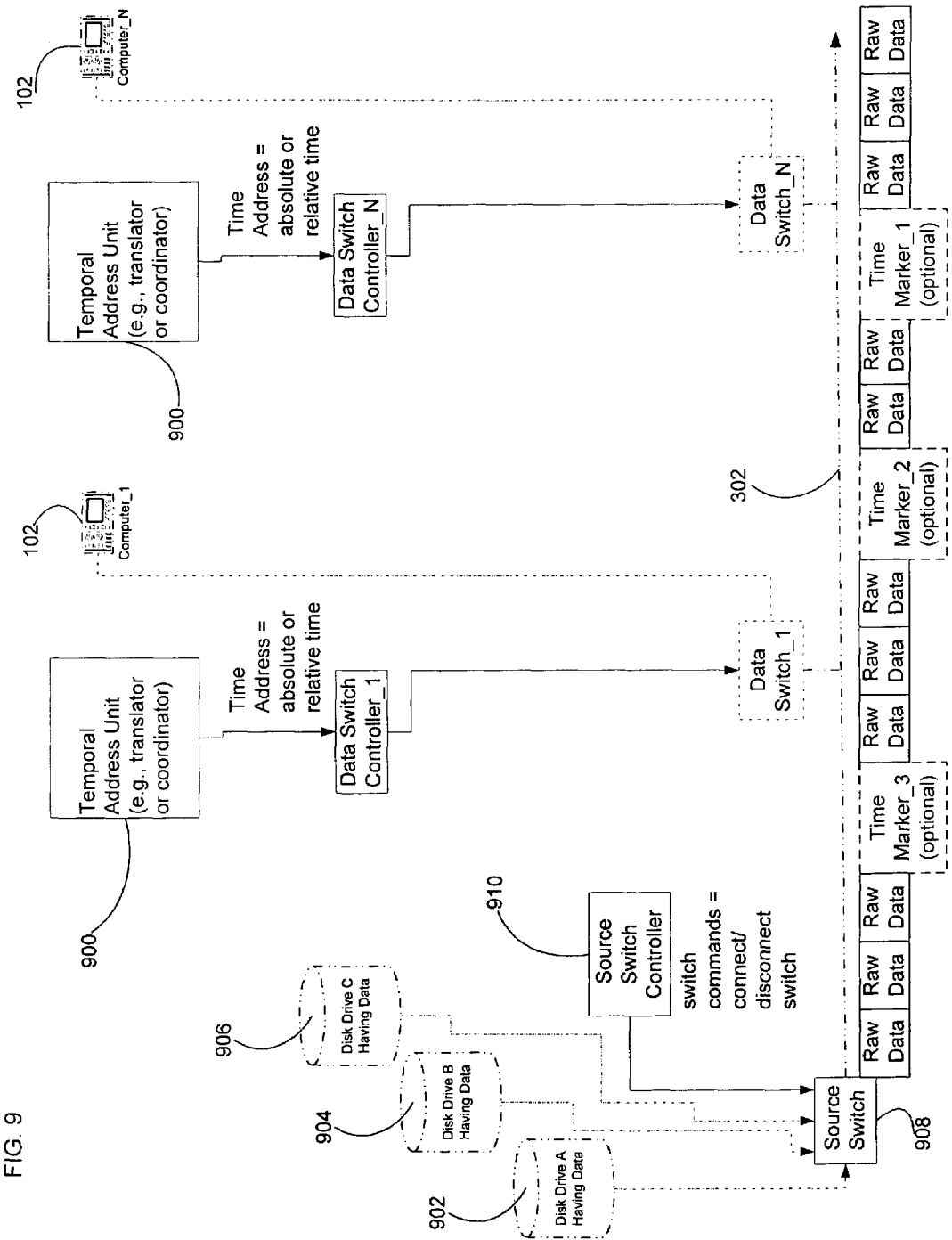
FIG. 9 illustrates a block diagram showing a spatial-to-temporal address translation method and system.

IV. Scheduling of Spatial-to-Temporal Translated Data and Related Devices and Processes With reference now to FIG. 9, illustrated is a block diagram showing a spatial-to-temporal address translation method and system. The method and system shown in FIG. 9 are similar to those of FIG. 8, except that in FIG. 9 more generic temporal address units 900 (representative of the spatial-to-temporal translators and coordinators described herein) are shown. Another difference is that FIG. 9 shows hard drive 300 replaced by hard drives 902, 904, and 906, and source controller 310 replaced by source switch 908 in conjunction with source switch controller 910. Hard drives 902, 904, and 906 are depicted as more or less continuously reading and transmitting their contents in a predetermined fashion (e.g., in a cyclic fashion where the contents of the disk are read out and transmitted in an outmost track to innermost track fashion). Source switch controller 910 is illustrated as controlling source switch 908 to intermittently connect the outputs of hard drives 902, 904, and 906 to communications medium 302. The other components shown in FIG. 9 function in a fashion similar to analogous components as described elsewhere herein.

Following are a series of flowcharts depicting embodiments of processes. For ease of understanding, the flowcharts are organized such that the initial flowcharts present embodiments via an overall "big picture" viewpoint and thereafter the following flowcharts present alternate embodiments and/or expansions of the "big picture" flowcharts as either substeps or additional steps building on one or more earlier-presented flowcharts. Those having ordinary skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process instances.

Figure 10:
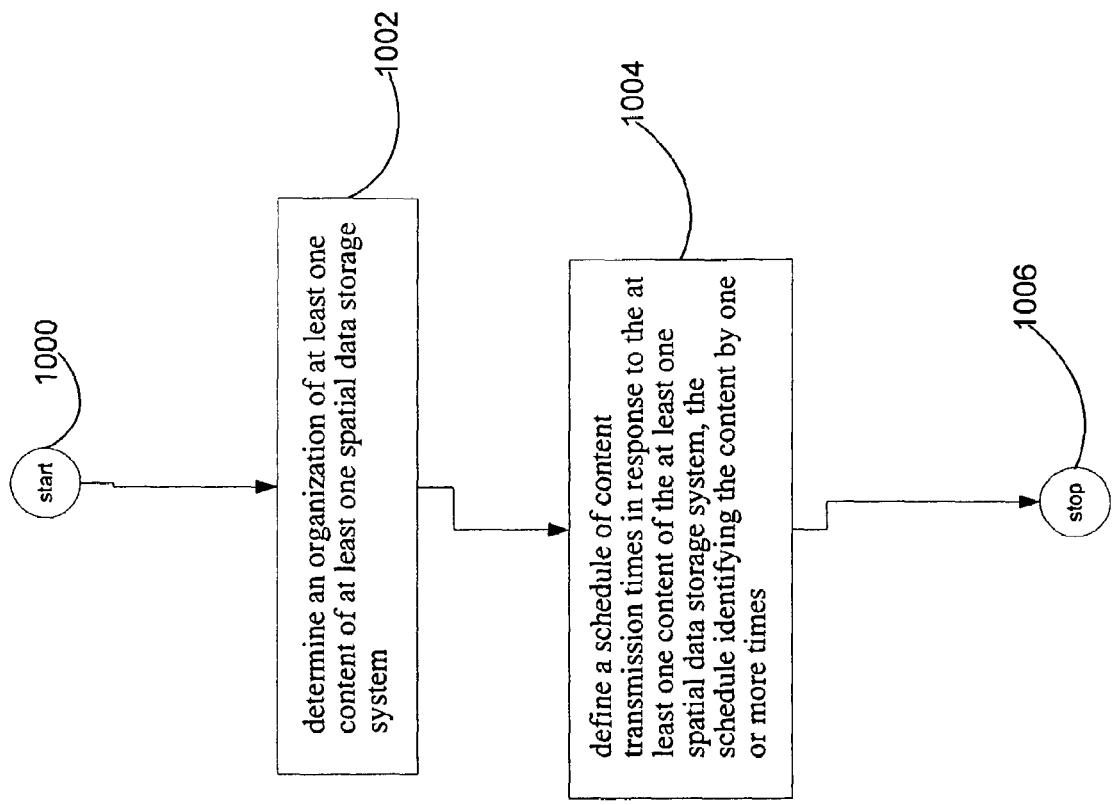
FIG. 10 shows a high level logic flowchart of a process. Method step 1000 shows the start of the process.

Referring now to FIG. 10, shown is a high level logic flowchart of a process. Method step 1000 shows the start of the process. Method step 1002 depicts determining an organization of at least one content of at least one spatial data storage system. Method step 1004 illustrates defining a schedule of content transmission times in response to the organization of the at least one content of the at least one spatial data storage system, the schedule identifying the content by one or more times. Method step 1006 shows the end of the process. Specific example implementations of the more general process implementations of FIG. 10 are described following.

Figure 11:
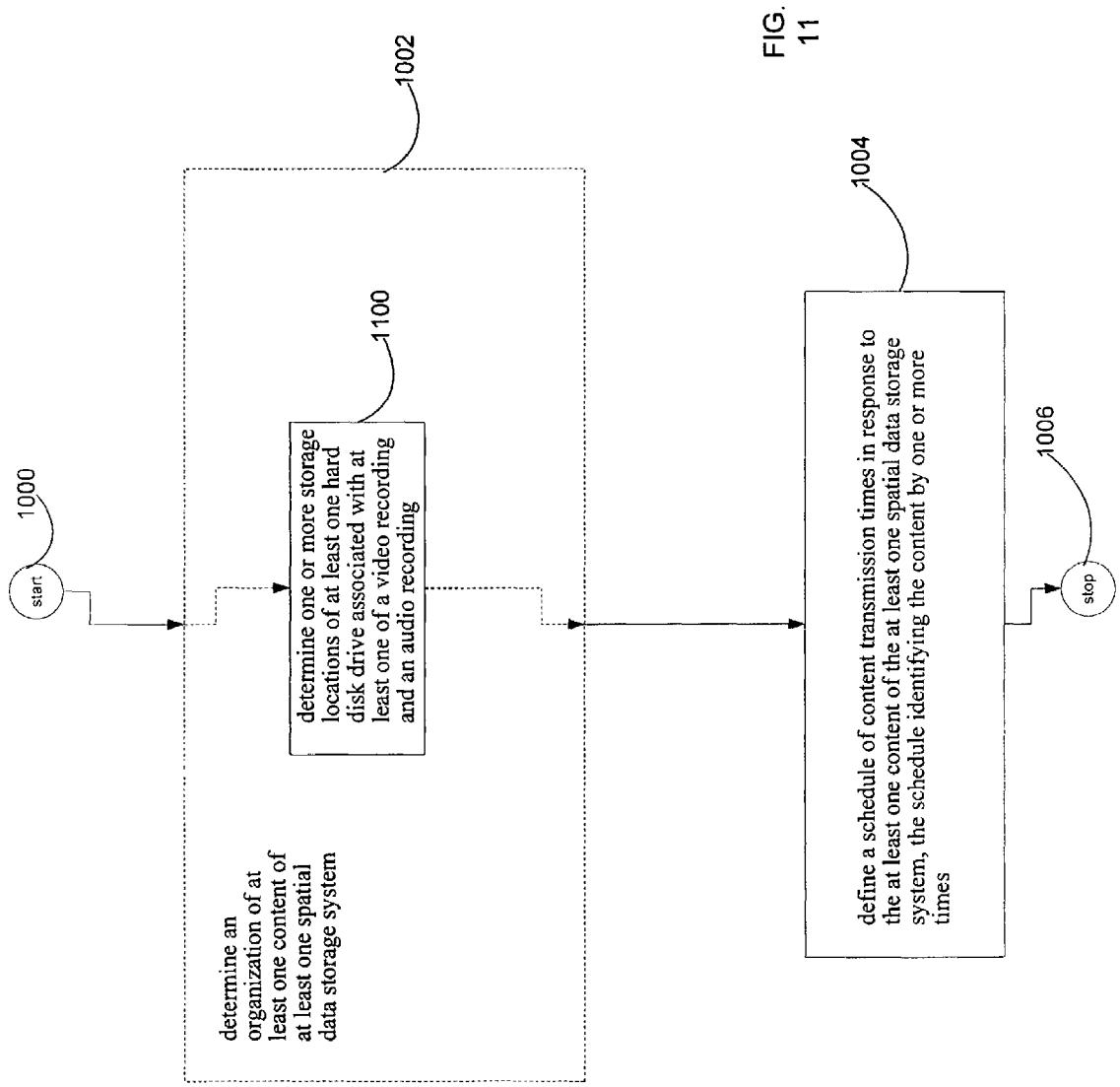
FIG. 11 shows a high-level logic flowchart depicting an alternate embodiment of the high-level logic flowchart of FIG. 10.

With reference now to FIG. 11, shown is a high-level logic flowchart depicting an alternate embodiment of the high-level logic flowchart of FIG. 10. Depicted is that in one alternate embodiment method step 1002 includes method step 1100. Method step 1100 shows determining one or more storage locations of at least one hard disk drive associated with at least one of a video recording and an audio recording. For example, determining the starting block and ending block coordinates of a movie recorded on concentric tracks of a hard drive and determining the starting block and the ending block coordinates of an audio file recorded on various sectors and tracks of a hard disk drive.

Figure 12:
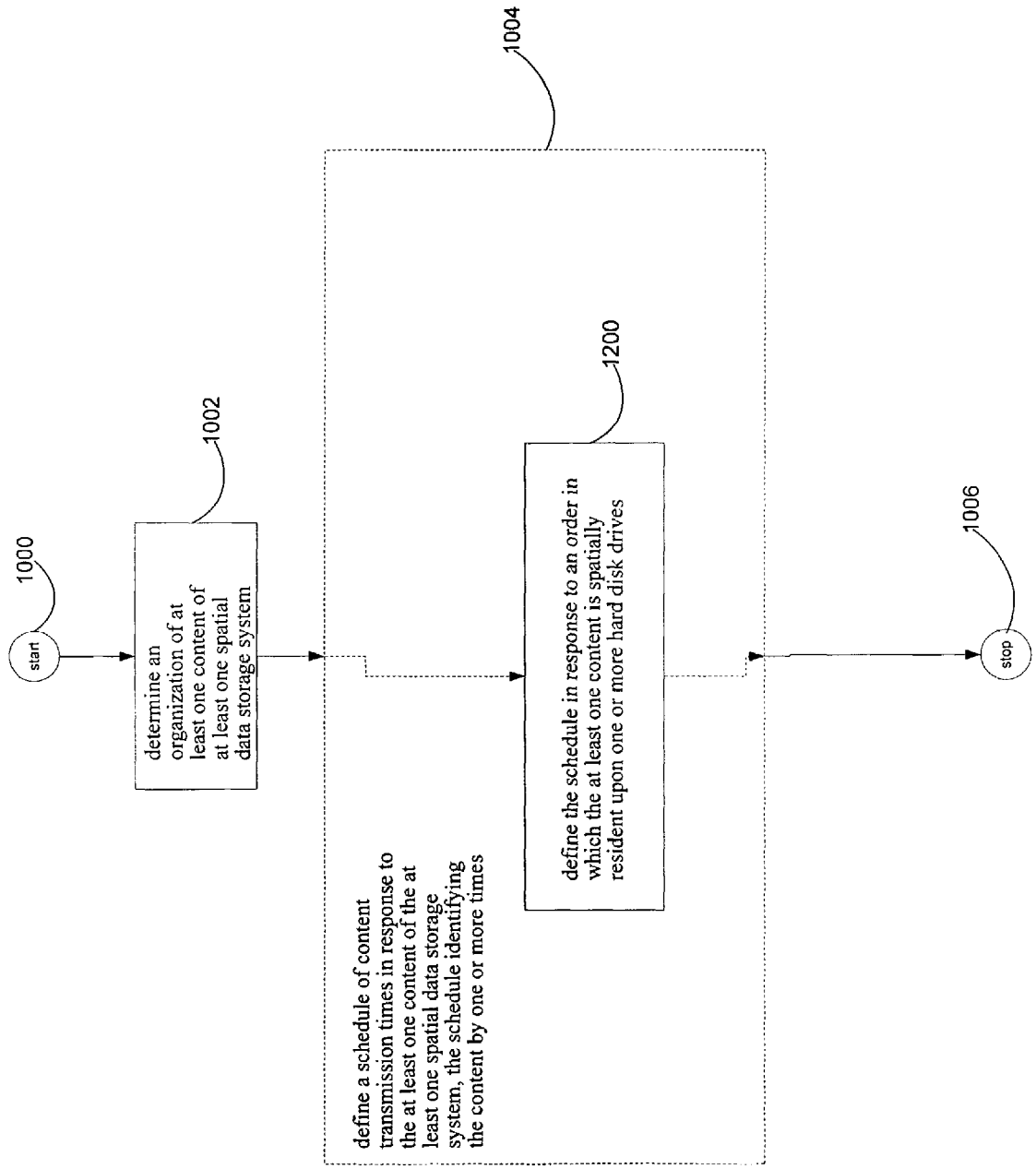
FIG. 12 shows a high-level logic flowchart depicting an alternate embodiment of the high-level logic flowchart of FIG. 10.

Referring now to FIG. 12, shown is a high-level logic flowchart depicting an alternate embodiment of the high-level logic flowchart of FIG. 10. Depicted is that in one alternate embodiment method step 1004 includes method step 1200. Method step 1200 shows defining the schedule in response to an order in which the at least one content is spatially resident upon one or more hard disk drives. For example, defining the schedule based on an order in which starting blocks and ending blocks are encountered when a movie recorded on concentric tracks of a hard drive, is read out in a predetermined fashion.

Figure 13:
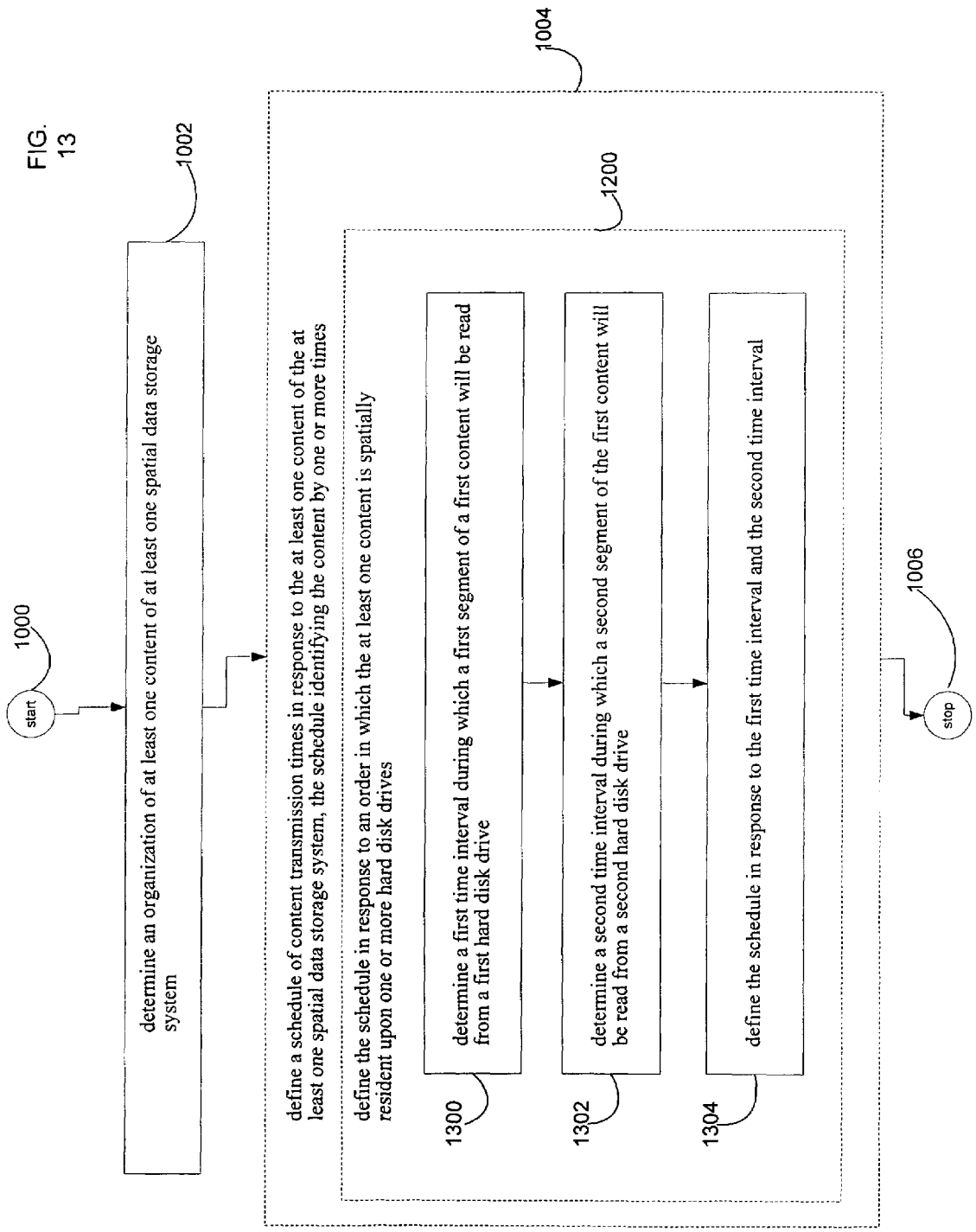
FIG. 13 shows a high-level logic flowchart depicting an alternate embodiment of the high-level logic flowchart of FIG. 12.

With reference now to FIG. 13, shown is a high-level logic flowchart depicting an alternate embodiment of the high-level logic flowchart of FIG. 12. Depicted is that in one alternate embodiment method step 1200 includes method step 1302, method step 1302, and method step 1304. Method step 1300 illustrates determining a first time interval during which a first segment of a first content will be read from a first hard disk drive. Method step 1302 shows determining a second time interval during which a second segment of the first content will be read from a second hard disk drive. Method step 1304 depicts defining the schedule in response to the first time interval and the second time interval.

Figure 14:
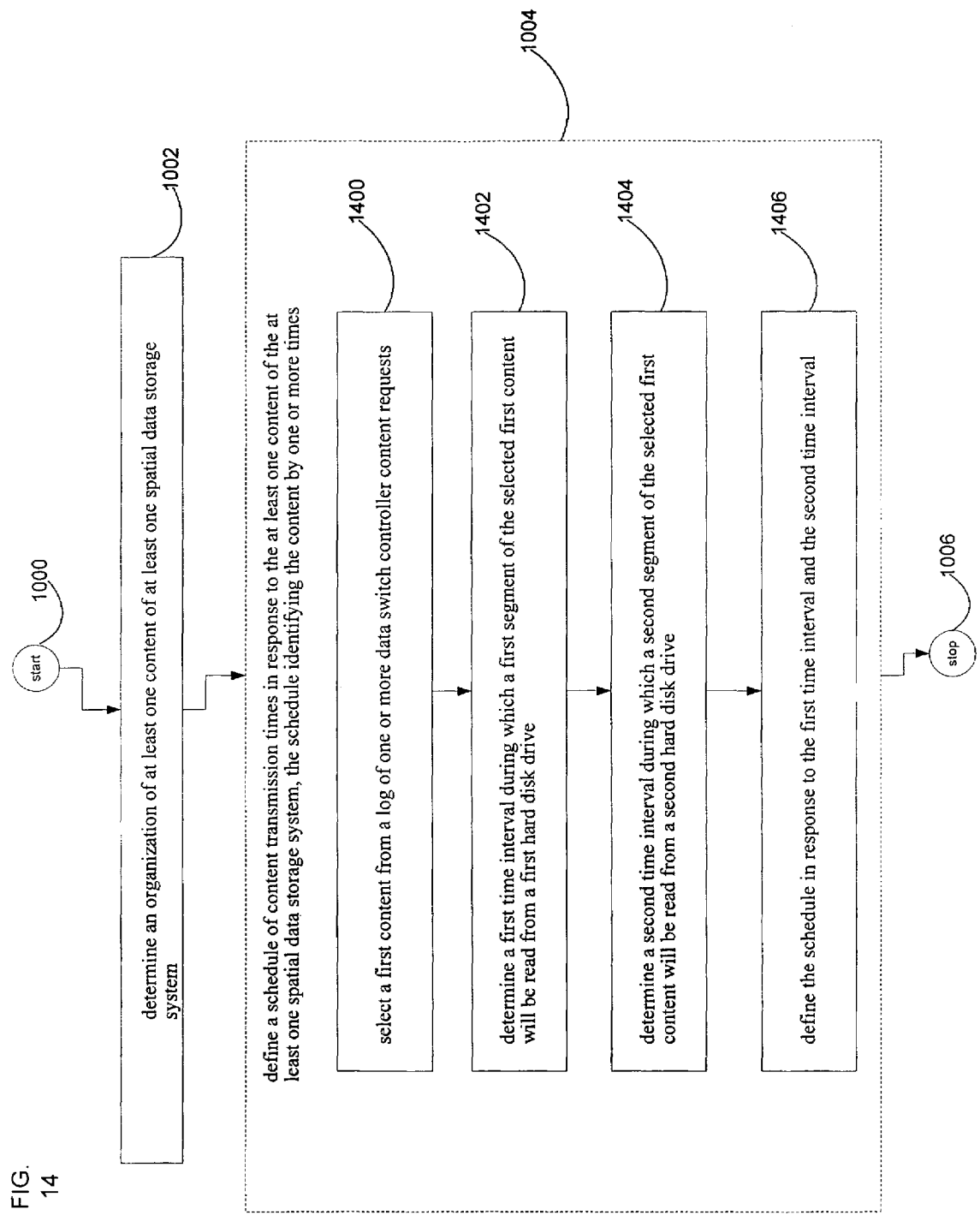
FIG. 14 shows a high-level logic flowchart depicting an alternate embodiment of the high-level logic flowchart of FIG. 10.

Referring now to FIG. 14, shown is a high-level logic flowchart depicting an alternate embodiment of the high-level logic flowchart of FIG. 10. Depicted is that in one alternate embodiment method step 1004 includes method step 1400, method step 1402, method step 1404, and method step 1406. Method step 1400 illustrates selecting a first content from a log of one or more data switch controller content requests. Method step 1402 shows determining a first time interval during which a first segment of the selected first content will be read from a first hard disk drive. Method step 1404 depicts determining a second time interval during which a second segment of the selected first content will be read from a second hard disk drive. Method step 1404 illustrates defining the schedule in response to the first time interval and the second time interval.

Figure 15:
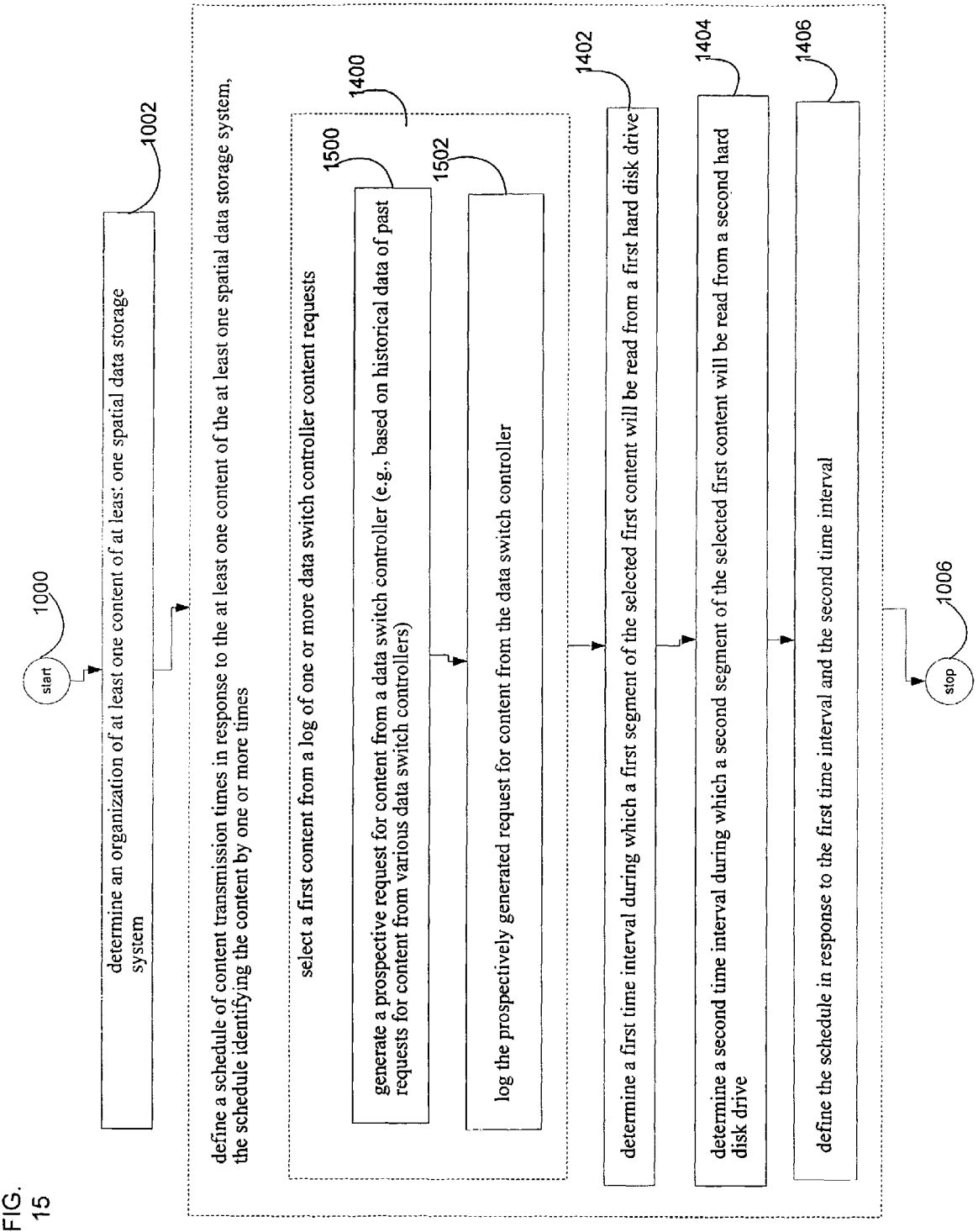
FIG. 15 shows a high-level logic flowchart depicting an alternate embodiment of the high-level logic flowchart of FIG. 14.

With reference now to FIG. 15, shown is a high-level logic flowchart depicting an alternate embodiment of the high-level logic flowchart of FIG. 14. Depicted is that in one alternate embodiment method step 1400 includes method step 1500 and method step 1502. Method step 1500 illustrates generating a prospective request for content from a data switch controller (e.g., based on historical data of past requests for content from various data switch controllers). Method step 1502 shows logging the prospectively generated request for content from the data switch controller.

Figure 16:
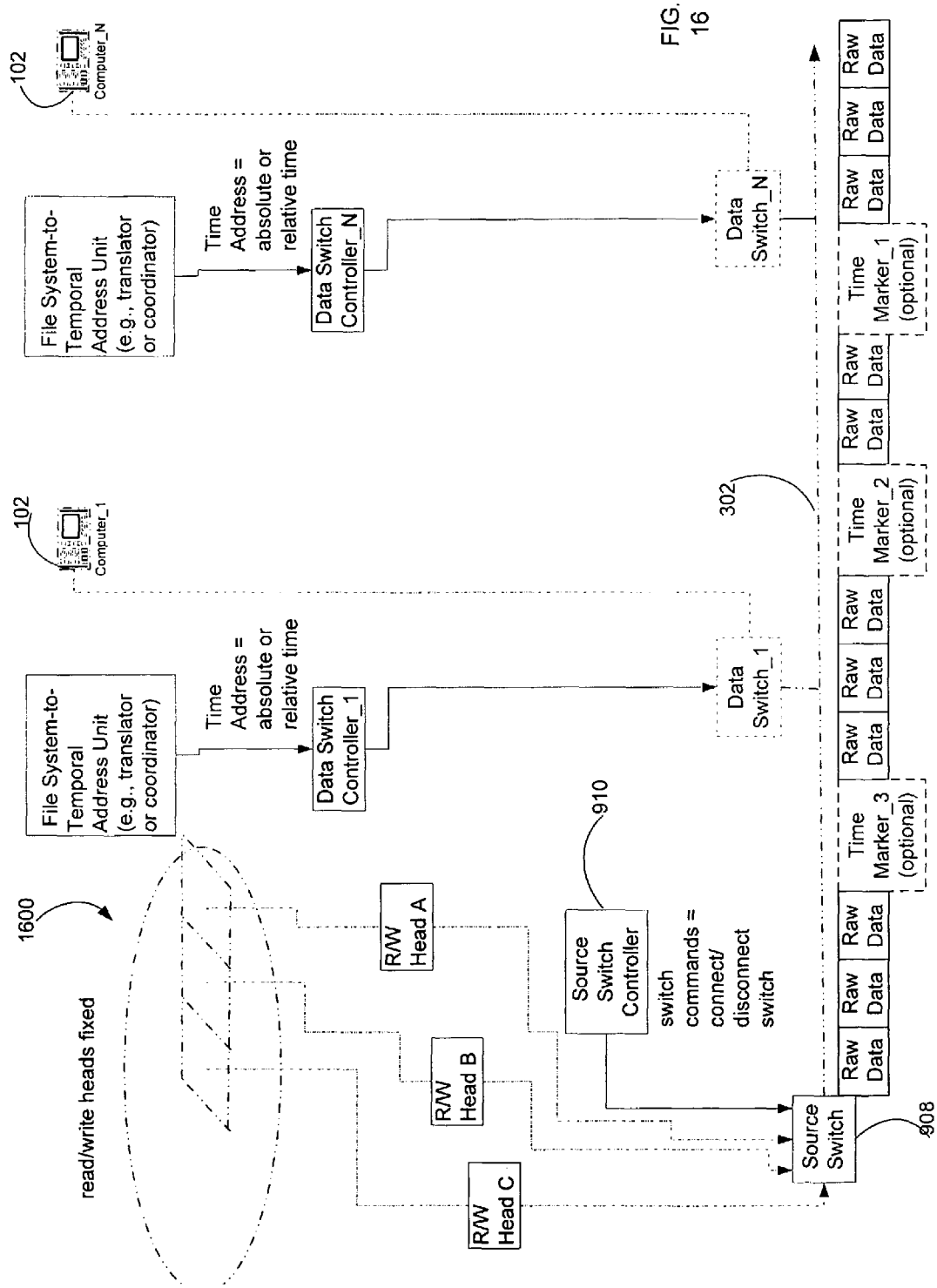
FIG. 16 shows a block diagram illustrating a spatial-to-temporal address translation method and system.

V. Spatial-to-Temporal Translated Data, Delay Disks, and Related Devices and Processes Referring now to FIG. 16, shown is a block diagram illustrating a spatial-to-temporal address translation method and system. The method and system shown in FIG. 16 are similar to those of FIG. 9, except that in FIG. 9 hard drives 902, 904, and 906 have been replaced by multi-head hard drive 1600. Multi-head hard drive 1600 is depicted as having 3 read write heads for directness of illustration, but in a typical embodiment there will be a one-to-one correspondence between disk tracks and disk heads. For example, in such an implementation a disk with 8 tracks would have 8 stationary disk heads, and the disk can be read from and written to by electronically switching amongst the 8 stationary disk tracks as the disk rotates. In addition, although only one multi-head disk drive is shown, in other implementations pluralities of the multi-head disk drivers are utilized. The other components shown in FIG. 16 function in a fashion similar to analogous components as described elsewhere herein.

With reference now to FIG. 17, shown is a partially schematic diagram of delay-reclocking disk 1700. With respect to FIG. 17, shown is that delay-reclocking disk 1700 has multi-head write arm A 1702, multi-head read arm A 1704, multi-head read arm B 1706, and multi-head read arm C 1708. In one implementation, data is delayed by multi-head write arm A 1702 receiving data from an external source 1710, and writing the received data to the disk track that provides a data rate that tracks substantially one-to-one with the received data. Thereafter, in one implementation the data is read out with multi-head read arm A 1704, multi-head read arm A, multi-head read arm B, or multi-head read arm C which respectively provide ¼, ½ and ¾ of a rotation delay.

Figure 18:
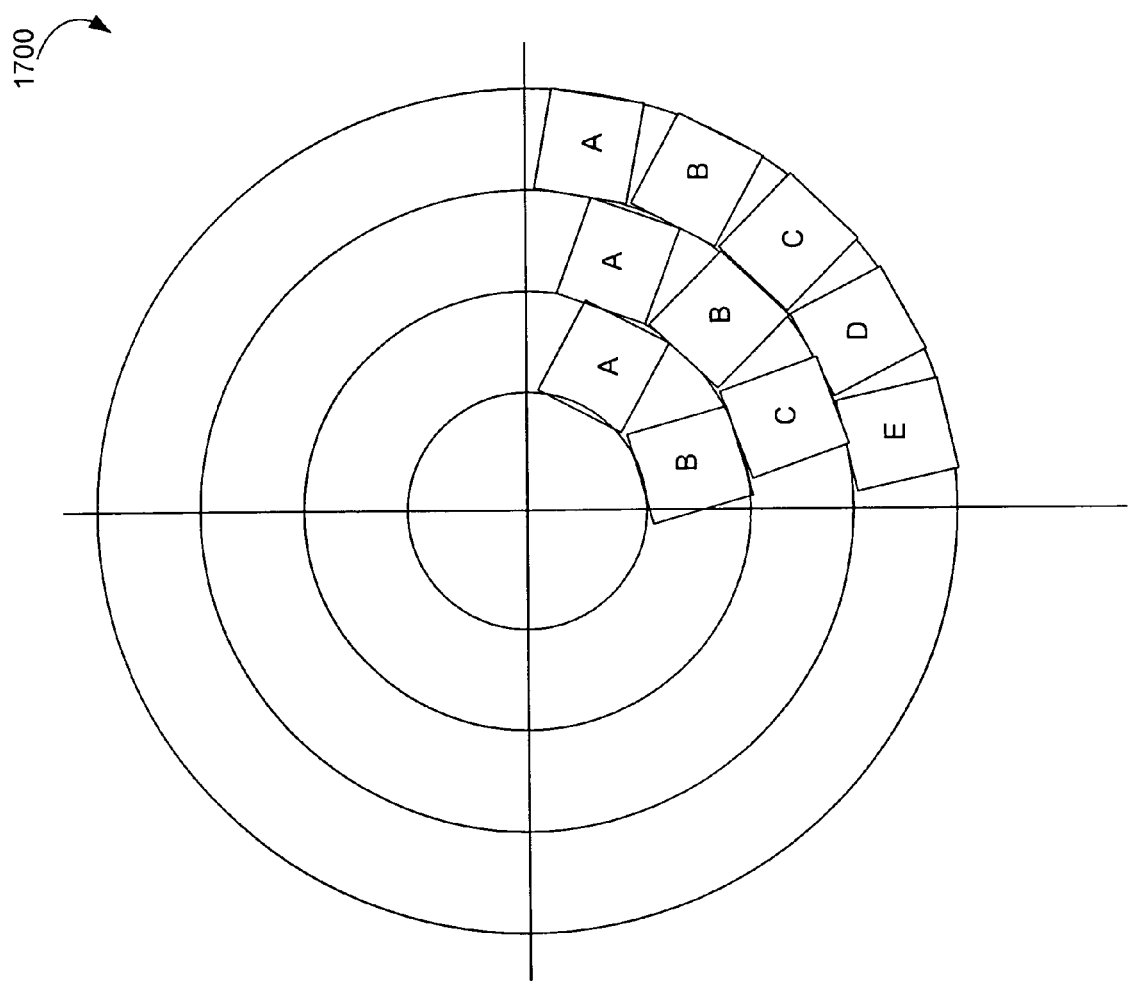
FIG. 18 shows an alternate partially schematic diagram of delay-reclocking disk 1700.

Referring now to FIG. 18, shown is an alternate partially schematic diagram of delay-reclocking disk 1700. With respect to FIG. 18, shown is that on a first-outermost track of delay-reclocking disk 1700 multi-head write arm A 1702 has written 5 bits denoted A, B, C, D, and E at substantially the smallest resolution of the disk drive, on a next-innermost track write arm A has written 3 bits denoted A, B, C, and on a next-innermost track write arm A has written 2 bits denoted A, and B. Assuming that delay-reclocking disk 1700 is rotating with an angular velocity such that ¼ of the disk is swept out every second, a head reading the outermost track can would read a data rate of 5 bits/second, a head reading the next inner-most track would read out a clock rate of 3 bits/second, and a head reading the next inner-most track would read out a clock rate of 1 bits/second. Thus, delay-reclocking disk 1700 can reclock the data to a slower data rate.

Delay-reclocking disk 1700 also provides the ability to reclock the data to a faster rate. For example, note that if A were read from the innermost track, B were read from the next-outermost track, and C were read from the farthest outermost track, the string A, B, C could be constructed that has a bit rate faster than it was originally written to the farthest outermost track. Thus, delay-reclocking disk 1700 can also increase the bit rate over that at which it was originally received.

Figure 19:
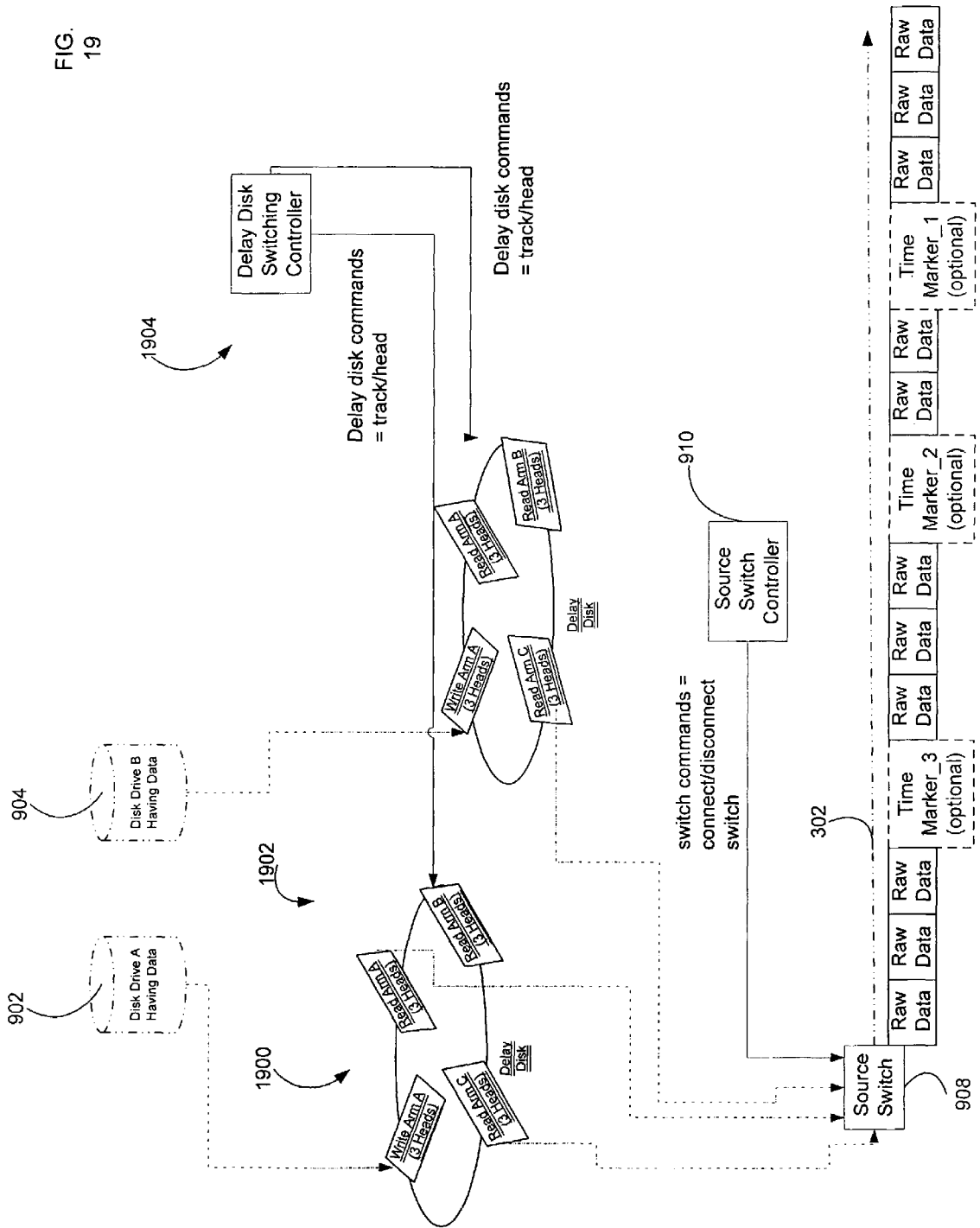
FIG. 19 shows a block diagram illustrating a spatial-to-temporal address translation method and system.

With reference now to FIG. 19, shown is a block diagram illustrating a spatial-to-temporal address translation method and system. The method and system shown in FIG. 19 are similar to those of FIG. 9, except that in FIG. 19 delay disks 1900 and 1902 are shown interposed between hard drives 902, 904 and source switch 908. Delay disk switching controller 1904 controls delay disks 1900 and 1902 to provide and and/or all of the functions of delay disks described herein. The other components shown in FIG. 19 function in a fashion similar to analogous components as described elsewhere herein.

Figure 20:
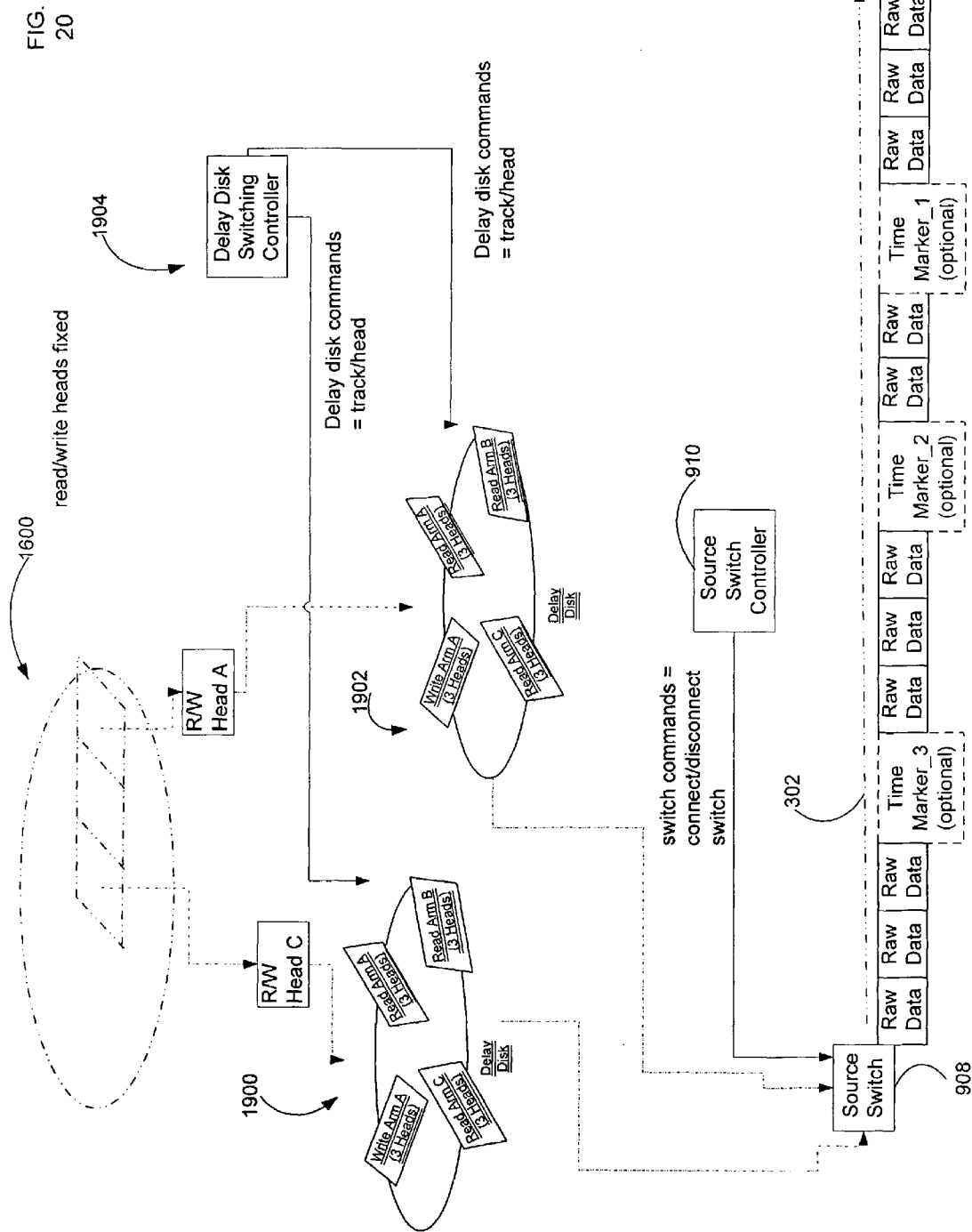
FIG. 20 shows a block diagram illustrating a spatial-to-temporal address translation method and system.

Referring now to FIG. 20, shown is a block diagram illustrating a spatial-to-temporal address translation method and system. The method and system shown in FIG. 20 are similar to those of FIG. 19, except that hard drives 902 and 904 are depicted as replaced by read-write heads of multi-head hard drive 1600. The other components shown in FIG. 20 function in a fashion similar to analogous components as described elsewhere herein.

Figure 21:
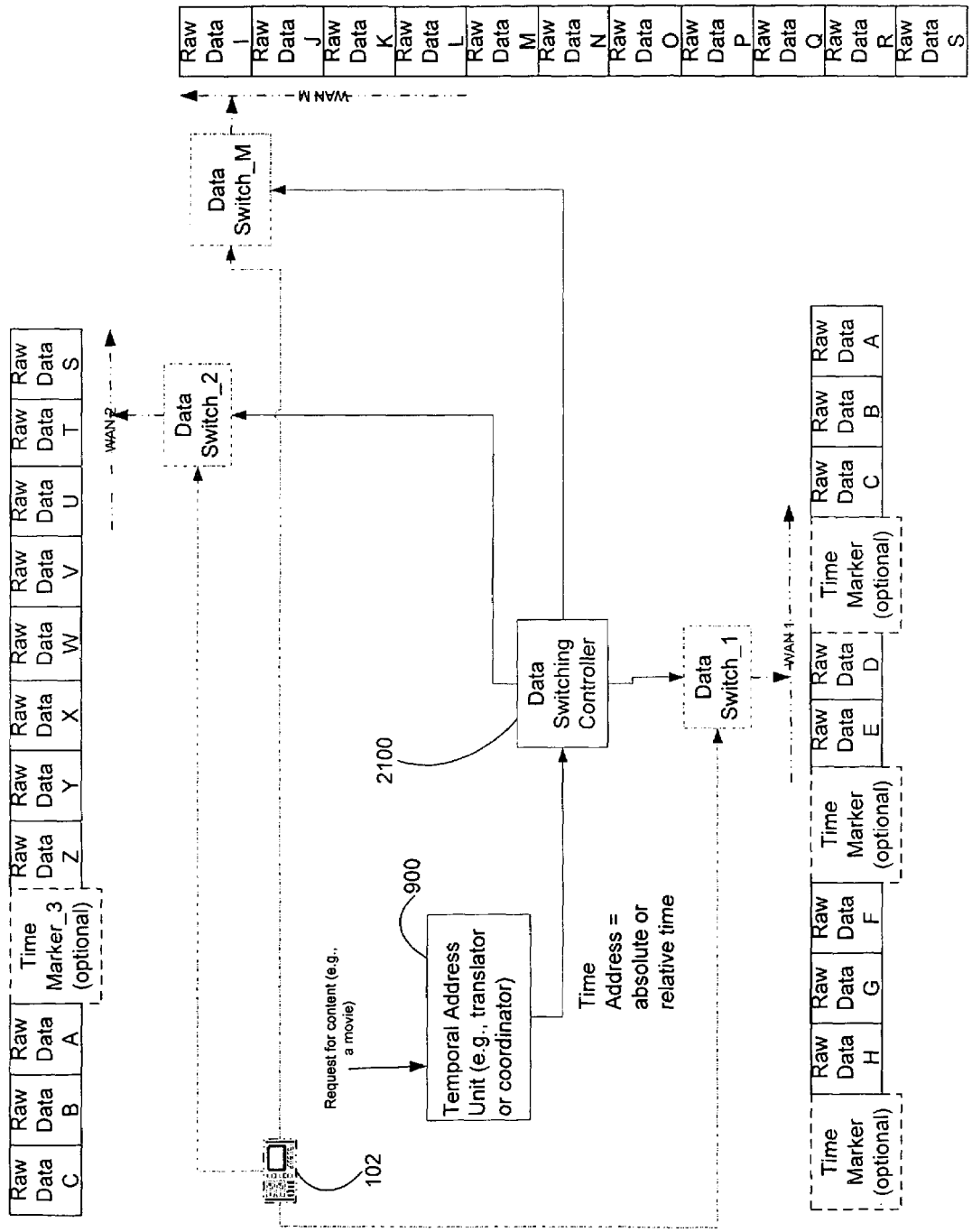
FIG. 21 shows a block diagram illustrating a spatial-to-temporal address translation method and system.

VI. Accelerated Reception of Spatial-to-Temporal Translated Data and Related Devices and Processes With reference now to FIG. 21, shown is a block diagram illustrating a spatial-to-temporal address translation method and system. Temporal address unit (e.g., translator or coordinator) 900 is depicted as generating one or more network specific (e.g., WAN-specific) temporal addresses in response to a request for at least a part of some content. Examples of such content are audio (a musical performance), video (e.g., an electrocardiogram), and audio-video content (e.g., a movie or play). The temporal addresses can be any of those described herein, such as absolute time addresses referenced against an atomic or transmitted clock, or relative time addresses referenced against at least one event such as the reception of one or more time markers in a data stream. Furthermore, although one or more methods and/or systems are described herein in terms of audio and or video data, such methods and/or systems have broad applicability to other types of data, such as that used by multiple processor systems and/or massively parallel systems (e.g., systems incorporating digital signal processors, co-processors, or similar systems).

Shown in FIG. 21 is that the temporal addresses correspond to raw data, which for sake of illustration is denoted as raw data units A through Z, each of which is addressed via the one or more WAN-specific temporal addresses. Temporal address unit 900 can equate the requested content with the WAN-specific time addresses of the various WAN-specific data segments with the requested content because temporal address unit 900 has knowledge of the schedules of content transmission times for WAN 1, 2, . . . M. Accordingly, temporal address unit 900 can consult the various content transmission schedules for the various WANs. Temporal address unit 900 may obtain the scheduling information from the various source controllers and/or source switch controllers of WAN 1, 2, . . . M through mechanisms described elsewhere herein, such as user input or transmission of the schedules either out of band or in band with the content transmitted over the various WANs; the schedules are typically distributed by the source controllers and/or source switch controllers (not shown) of the WANs. Those having skill in the art will appreciate that figures and/or text herein are generally illustrative specific implementations of more methods and/or systems, and that the methods and/or systems are, in general, not limited to the implementations shown. For example, those having skill in the art will appreciate that the method and/or system of FIG. 21 is not limited to WANs, but can entail other types of communications systems.

Data switching controller 2100 is shown as receiving one or more temporal addresses from temporal address unit (e.g., translator or coordinator) 900. Data switching controller 2100 is depicted as controlling M data switches: data switch_1, data switch_2, and data switch_M in response to the temporal address units. The M data switches are illustrated as coupling with M separate wide area networks: WAN 1, WAN 2, and WAN M. The M wide area networks are shown as carrying the same content transmitted by their respective data sources (not shown). The content on the M wide area networks is shown as the same, but the content on each network, when viewed relative to each data switch, is shown staggered relative to the content on the others. The data rates and content on the various M wide are networks are assumed, for sake of illustration, to be the same. However, in other implementations, the data rates and/or content are different.

Continuing to refer to FIG. 21, depicted is that, assuming that temporal address unit 900 has asked for WAN-specific time addresses that equate to raw data time segments A, B, C, . . . Z, data switching controller 2100 can use data switch M to assemble raw data time segments I, J, K, . . . , S from WAN M (e.g., roughly 11 time segments). At roughly the same time, system-to-temporal address unit 2100 can use data switch_2 to assemble raw data time segments T-C from WAN 2 (e.g., roughly 10 time segments). Also at roughly the same time, data switching controller 2100 can use data switch_1 to assemble raw data time segments D-H from WAN 1 (e.g., roughly 5 time segments). Thereafter, data switching controller concatenates the raw data obtained to construct raw data A-Z in sequence. As can be seen in FIG. 1, data switching controller 2100 can return raw data A-Z to temporal address unit 200 by concatenating A-C from the time segments of WAN 2, D-H from the time segments of WAN 1, I-S from the time segments of WAN M, and T-Z from the time segments of WAN 2. Assuming for sake of example that the data rates on WAN 1, 2 and M are the same, and that the requisite switching and concatenation can be done in near-real time, the foregoing shows that the A-Z raw data stream can be assembled in just slightly over the time required to obtain 11 raw data segments (e.g., raw data segments I-S on WAN M), rather than the time required to obtain the 26 segments A-Z from a single WAN.

Figure 22:
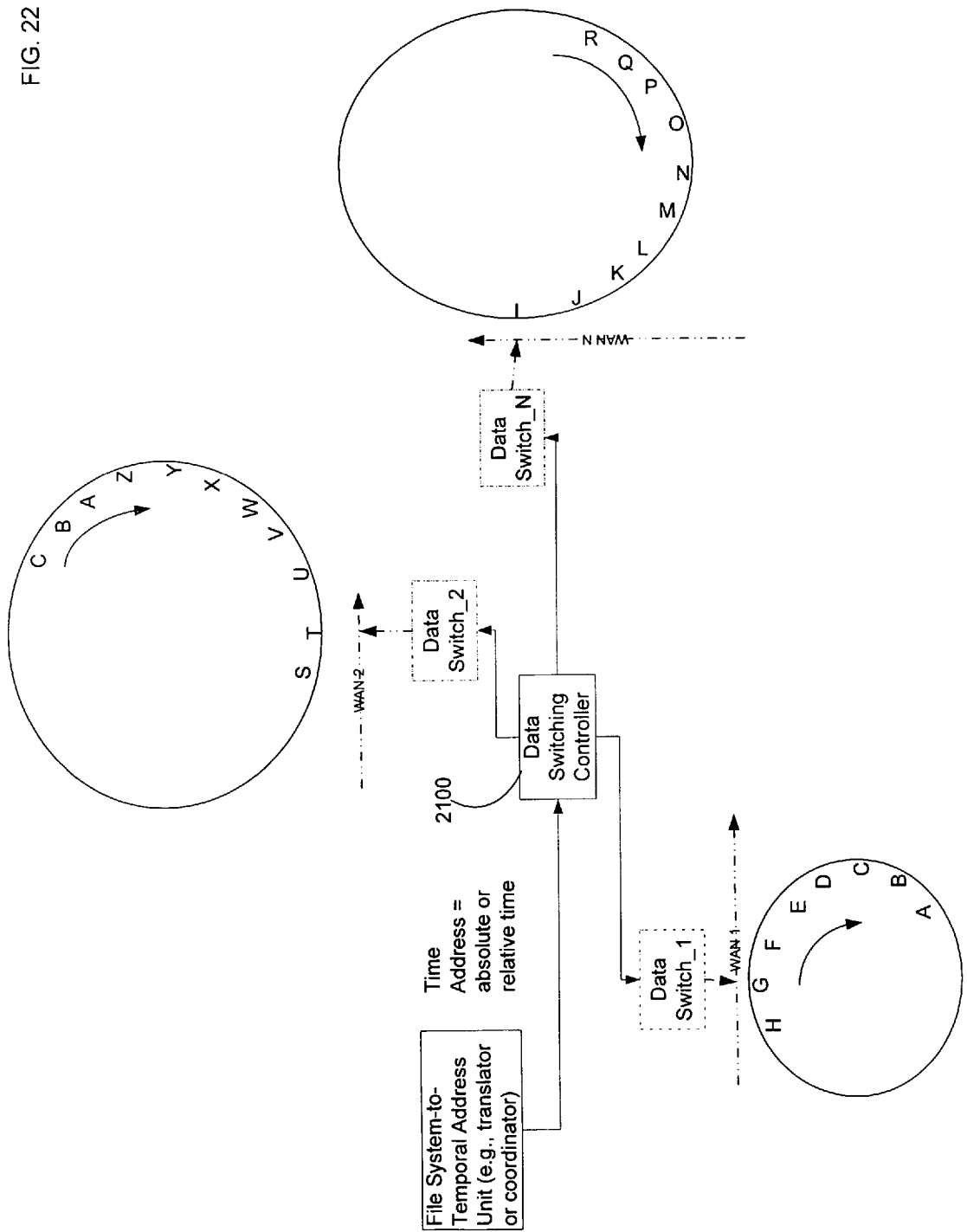
FIG. 22 shows a block diagram of the system of FIG. 21 that illustrates a spatial-to-temporal address translation method and system.

Referring now to FIG. 22, shown is a block diagram of the system of FIG. 21 that illustrates a spatial-to-temporal address translation method and system. Depicted is that the content describes as linearly transiting the data switches 1 to M in FIG. 21 can also be viewed as logically circulating in loops. In addition, not only can the data be viewed as logically circulating in loops, but in some implementations the data is actually circulating in physical loops constructed over media (e.g., rings running at least in part on media; rings running on virtually any interconnected ring that can be constructed from a network of nodes where the interconnected ring can include one or more repeaters, bridges, and/or routers).

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

Those skilled in the art will recognize that optical aspects of implementations will require optically-oriented hardware, software, and or firmware.

The foregoing detailed description has set forth various embodiments of the devices and/or processes via the use of block diagrams, flowcharts, and examples. Insofar as such block diagrams, flowcharts, and examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. In one embodiment, the present invention may be implemented via Application Specific Integrated Circuits (ASICs), Field Programmable Gate Arrays (FPGAs), or other integrated formats. However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various embodiments described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs.

Those skilled in the art will recognize that it is common within the art to describe devices and/or processes in the fashion set forth herein, and thereafter use standard engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, computational entities such as operating systems, drivers, and applications programs, and one or more interaction devices, such as a keyboard, a mouse, or audio component. A typical data processing system may be implemented utilizing any suitable commercially available computer system.

Those skilled in the art will recognize that it is common within the art to describe devices and/or processes in the fashion set forth herein, and thereafter use standard engineering practices to integrate such described devices and/or processes into communications systems. That is, at least a portion of the devices and/or processes described herein can be integrated into a communications system via a reasonable amount of experimentation. Those having skill in the art will recognize that a typical communications system generally includes one or more of a network operating system, a network interface card, a communications medium (e.g., electronic, optical, wireless, etc.), a data bus, and devices to couple communications media (e.g., switches, bridges, routers, repeaters, etc). A typical communications system may be implemented utilizing any suitable commercially available network components (e.g., local area network components, wide area network components, optical network components, wireless network components, virtual private network components, etc.).

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be understood by those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," "comprise" and variations thereof, such as, "comprises" and "comprising" are to be construed in an open, inclusive sense, that is as "including, but not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

The invention claimed is:

1. A method comprising:
    receiving a request for data having at least one specific content;
    obtaining one or more first-network temporal addresses corresponding to the at least one specific content in response to the request for data having the at least one specific content;
    obtaining one or more second-network temporal addresses corresponding to the at least one specific content, in response to the request for data having the at least one specific content;
    applying the one or more first-network temporal addresses to receive a first part of the at least one specific content being transmitted from a first network while at the same time applying the one or more second-network temporal addresses to receive a second part of the at least one specific content being transmitted from a second network; and
    constructing the at least one content from the first part of the at least one specific content being transmitted from the first network and the second part of the at least one specific content being transmitted from the second network.

2. The method of claim 1, wherein said receiving a request for data having at least one specific content further comprises:
    receiving a request for at least a portion of recorded video.

3. The method of claim 1, wherein said receiving a request for data having at least one specific content further comprises:
    receiving a request for at least a portion of recorded audio.

4. The method of claim 1, wherein said receiving a request for data having at least one specific content further comprises:
    receiving a request for at least a portion of recorded audio and video.

5. The method of claim 1, wherein the receiving a request for data having at least one specific content further comprises:
    receiving a request for at least a portion of at least one of computer processable and network processable data.

6. The method of claim 1, wherein said obtaining one or more first-network temporal addresses corresponding to the at least one specific content, in response to the request for data having the at least one specific content further comprises:
    associating the specific content with one or more times of one or more first network transmitted data portions.

7. The method of claim 6, wherein said associating the specific content with one or more times of one or more first network transmitted data portions further comprises:
    consulting a first-network schedule having the specific content in association with the one or more times of the one or more transmitted data portions.

8. The method of claim 7, wherein said consulting a first-network schedule having the specific content in association with the one or more times of the one or more transmitted data portions further comprises:
    consulting a first-network schedule published by at least one of a first-network source controller and a first-network source switch controller.

9. The method of claim 8, wherein said consulting a first-network schedule published by at least one of a first-network source controller and a first-network source switch controller further comprises:
    accepting input of the first-network schedule published by at least one of the first-network source controller and the first-network source switch controller.

10. The method of claim 7, wherein said consulting a first-network schedule having the specific content in association with the one or more times of the one or more transmitted data portions further comprises:
    consulting a first-network schedule received from at least one of a first-network source controller and a first-network source switch controller.

11. The method of claim 10, wherein said consulting a first-network schedule received from at least one of a first-network source controller and a first-network source switch controller further comprises:
    receiving the first-network schedule from a data stream.

12. The method of claim 6, wherein said associating the specific content with one or more times of one or more first network transmitted data portions further comprises:
    associating the specific content with at least one absolute time associated with a clock.

13. The method of claim 12, wherein said associating the specific content with at least one absolute time associated with a clock further comprises:
    associating the specific content with at least one absolute time associated with at least one of an atomic clock, a global clock, a relative clock, a transmitted clock, and a number of ticks relative to some specified received data.

14. The method of claim 12, wherein said associating the specific content with at least one absolute time associated with a clock further comprises:
    associating the specific content with at least one absolute time associated with a transmitted clock.

15. The method of claim 6, wherein said associating the specific content with one or more times of one or more first network transmitted data portions further comprises:
    associating the specific content with at least one relative time.

16. The method of claim 15, wherein said associating the specific content with at least one relative time further comprises:
    associating the specific content with at least one time relative to a received marker.

17. The method of claim 15, wherein said associating the specific content with at least one relative time further comprises:
    associating the specific content with at least one time of a first and a second received marker.

18. The method of claim 1, wherein said obtaining one or more second-network temporal addresses corresponding to the at least one specific content, in response to the request for data having the at least one specific content further comprises:
    associating the specific content with one or more times of one or more second network transmitted data portions.

19. The method of claim 18, wherein said associating the specific content with one or more times of one or more second network transmitted data portions further comprises:
consulting a second-network schedule having the specific content in association with the one or more times of the one or more transmitted data portions.

20. The method of claim 19, wherein said consulting a second-network schedule having the specific content in association with the one or more times of the one or more transmitted data portions further comprises:
consulting a second-network schedule published by at least one of a second-network source controller and a second-network source switch controller.

21. The method of claim 20, wherein said consulting a second-network schedule published by at least one of a second-network source controller and a second-network source switch controller further comprises:
accepting input of the second-network schedule published by at least one of the second-network source controller and the second-network source switch controller.

22. The method of claim 19, wherein said consulting a second-network schedule having the specific content in association with the one or more times of the one or more transmitted data portions further comprises:
consulting a second-network schedule received from at least one of a second-network source controller and a second-network source switch controller.

23. The method of claim 22, wherein said consulting a second-network schedule received from at least one of a second-network source controller and a second-network source switch further comprises:
receiving the second-network schedule from a data stream.

24. The method of claim 18, wherein said associating the specific content with one or more times of one or more second network transmitted data portions further comprises:
associating the specific content with at least one absolute time associated with a clock.

25. The method of claim 24, wherein said associating the specific content with at least one absolute time associated with a clock further comprises:
associating the specific content with at least one time associated with at least one of an atomic clock, a global clock, a relative clock, a transmitted clock, and a number of ticks relative to some specified received data.

26. The method of claim 24, wherein said associating the specific content with at least one absolute time associated with a clock further comprises:
associating the specific content with at least one absolute time associated with a transmitted clock.

27. The method of claim 18, wherein said associating the specific content with one or more times of one or more second network transmitted data portions further comprises:
associating the specific content with at least one relative time.

28. The method of claim 27, wherein said associating the specific content with at least one relative time further comprises:
associating the specific content with at least one time relative to a received marker.

29. The method of claim 27, wherein said associating the specific content with at least one relative time further comprises:
associating the specific content with at least one time of a first and a second received marker.

30. The method of claim 1, wherein said constructing the at least one content from the first network and the second network further comprises:
agglomerating a portion of the at least one content received from the first network with a portion of the at least one content received from the second network.

31. The method of claim 1, wherein said constructing the at least one content from the first network and the second network further comprises:
interleaving a portion of the at least one content received from the first network with a portion of the at least one content received from the second network.

32. The method of claim 1, wherein said constructing the at least one content from the first network and the second network further comprises:
selecting data from at least one data stream having file-address-to-temporal-address translated data.

33. The method of claim 1, wherein said constructing the at least one content from the first network and the second network further comprises:
selecting data from at least one data stream having disk-address-to-temporal-address translated data.

34. The method of claim 1, wherein said constructing the at least one content from the first network and the second network further comprises:
selecting data from at least one data stream having tape-address-to-temporal-address translated data.

35. The method of claim 1, wherein said constructing the at least one content from the first network and the second network further comprises:
selecting data from at least one data stream having substantially static memory-address-to-temporal-address translated data.

36. The method of claim 1, wherein said constructing the at least one content from the first network and the second network further comprises:
selecting data from at least one data stream having object-address-to-temporal-address translated data.

37. A system comprising:
means for receiving a request for data having at least one specific content;
means for obtaining one or more first-network temporal addresses corresponding to the at least one specific content, in response to the request for data having the at least one specific content;
means for obtaining one or more second-network temporal addresses corresponding to the at least one specific content, in response to the request for data having the at least one specific content;
means for applying the one or more first-network temporal addresses to receive a first part of the at least one specific content being transmitted from a first network while at the same time applying the one or more second-network temporal addresses to receive a second part of the at least one specific content being transmitted from a second network; and
means for constructing the at least one content from the first part of the at least one specific content being transmitted from the first network and the second part of the at least one specific content being transmitted from the second network.

38. The system of claim 37, wherein said means for receiving a request for data having at least one specific content further comprises:
means for receiving a request for at least a portion of recorded video.

39. The system of claim 37, wherein said means for receiving a request for data having at least one specific content further comprises:

means for receiving a request for at least a portion of recorded audio.

40. The system of claim 37, wherein said means for receiving a request for data having at least one specific content further comprises:
means for receiving a request for at least a portion of recorded audio and video.

41. The system of claim 37, wherein the means for receiving a request for data having at least one specific content further comprises:
means for receiving a request for at least a portion of at least one of computer processable and network processable data.

42. The system of claim 37, wherein said means for obtaining one or more second-network temporal addresses corresponding to the at least one specific content, in response to the request for data having the at least one specific content further comprises:
means for associating the specific content with one or more times of one or more first network transmitted data portions.

43. The system of claim 42, wherein said means for associating the specific content with one or more times of one or more first network transmitted data portions further comprises:
means for consulting a first-network schedule having the specific content in association with the one or more times of the one or more transmitted data portions.

44. The system of claim 43, wherein said means for consulting a first-network schedule having the specific content in association with the one or more times of the one or more transmitted data portions further comprises:
means for consulting a first-network schedule published by at least one of a first-network source controller and a first-network source switch controller.

45. The system of claim 44, wherein said means for consulting a first-network schedule published by at least one of a first-network source controller and a first-network source switch controller further comprises:
means for accepting input of the first-network schedule published by at least one of the first-network source controller and the first-network source switch controller.

46. The system of claim 43, wherein said means for consulting a first-network schedule having the specific content in association with the one or more times of the one or more transmitted data portions further comprises:
means for consulting a first-network schedule received from at least one of a first-network source controller and a first-network source switch controller.

47. The system of claim 46, wherein said means for consulting a first-network schedule received from at least one of a first-network source controller and a first-network source switch controller further comprises:
means for receiving the first-network schedule from a data stream.

48. The system of claim 42, wherein said means for associating the specific content with one or more times of one or more first network transmitted data portions further comprises:
means for associating the specific content with at least one absolute time associated with a clock.

49. The system of claim 48, wherein said means for associating the specific content with at least one absolute time associated with a clock further comprises:
means for associating the specific content with at least one absolute time associated with an atomic clock time.

50. The system of claim 48, wherein said means for associating the specific content with at least one absolute time associated with a clock further comprises:
means for associating the specific content with at least one time associated with at least one of an atomic clock, a global clock, a relative clock, a transmitted clock, and a number of ticks relative to some specified received data.

51. The system of claim 42, wherein said means for associating the specific content with one or more times of one or more first network transmitted data portions further comprises:
means for associating the specific content with at least one relative time.

52. The system of claim 51, wherein said means for associating the specific content with at least one relative time further comprises:
means for associating the specific content with at least one time relative to a received marker.

53. The system of claim 51, wherein said means for associating the specific content with at least one relative time further comprises:
means for associating the specific content with at least one time of a first and a second received marker.

54. The system of claim 37, wherein said obtaining one or more second-network temporal addresses corresponding to the at least one specific content, in response to the request for data having the at least one specific content further comprises:
means for associating the specific content with one or more times of one or more second network transmitted data portions.

55. The system of claim 54, wherein said means for associating the specific content with one or more times of one or more second network transmitted data portions further comprises:
means for consulting a second-network schedule having the specific content in association with the one or more times of the one or more transmitted data portions.

56. The system of claim 55, wherein said means for consulting a second-network schedule having the specific content in association with the one or more times of the one or more transmitted data portions further comprises:
means for consulting a second-network schedule published by at least one of a second-network source controller and a second-network source switch controller.

57. The system of claim 56, wherein said means for consulting a second-network schedule published by at least one of a second-network source controller and a second-network source switch controller further comprises:
means for accepting input of the second-network schedule published by at least one of the second-network source controller and the second-network source switch controller.

58. The system of claim 55, wherein said means for consulting a second-network schedule having the specific content in association with the one or more times of the one or more transmitted data portions further comprises:
means for consulting a second-network schedule received from at least one of a second-network source controller and a second-network source switch controller.

59. The system of claim 58, wherein said means for consulting a second-network schedule received from at least one of a second-network source controller and a second-network source switch controller further comprises:
means for receiving the second-network schedule from a data stream.

60. The system of claim 54, wherein said means for associating the specific content with one or more times of one or more second network transmitted data portions further comprises:
means for associating the specific content with at least one absolute time associated with a clock.

61. The system of claim 60, wherein said means for associating the specific content with at least one absolute time associated with a clock further comprises:
means for associating the specific content with at least one absolute time associated with an atomic clock time.

62. The system of claim 60, wherein said means for associating the specific content with at least one absolute time associated with a clock further comprises:
means for associating the specific content with at least one time associated with at least one of an atomic clock, a global clock, a relative clock, a transmitted clock, and a number of ticks relative to some specified received data.

63. The system of claim 54, wherein said means for associating the specific content with one or more times of one or more second network transmitted data portions further comprises:
means for associating the specific content with at least one relative time.

64. The system of claim 63, wherein said means for associating the specific content with at least one relative time further comprises:
means for associating the specific content with at least one time relative to a received marker.

65. The system of claim 63, wherein said means for associating the specific content with at least one relative time further comprises:
means for associating the specific content with at least one time of a first and a second received marker.

66. The system of claim 37, wherein said means for constructing the at least one content from the first network and the second network further comprises:
means for agglomerating a portion of the at least one content received from the first network with a portion of the at least one content received from the second network.

67. The system of claim 37, wherein said means for constructing the at least one content from the first network and the second network further comprises:
means for interleaving a portion of the at least one content received from the first network with a portion of the at least one content received from the second network.

68. The system of claim 37, wherein said means for constructing the at least one content from the first network and the second network further comprises:
means for selecting data from at least one data stream having file-address-to-temporal-address translated data.

69. The system of claim 37, wherein said means for constructing the at least one content from the first network and the second network further comprises:
means for selecting data from at least one data stream having disk-address-to-temporal-address translated data.

70. The system of claim 37, wherein said means for constructing the at least one content from the first network and the second network further comprises:
means for selecting data from at least one data stream having tape-address-to-temporal-address translated data.

71. The system of claim 37, wherein said means for constructing the at least one content from the first network and the second network further comprises:
means for selecting data from at least one data stream having substantially static memory-address-to-temporal-address translated data.

72. The system of claim 37, wherein said means for constructing the at least one content from the first network and the second network further comprises:
means for selecting data from at least one data stream having object-address-to-temporal-address translated data.

73. A system comprising:
a temporal address unit configured to receive a request for a substance of data; and
a data switch controller configured to:
generate one or more first-network temporal addresses and second-network temporal addresses in response to the request for the substance;
apply the one or more first-network temporal addresses to receive a first part of the at least one specific content from a first network while at the same time applying the one or more second-network temporal addresses to receive a second part of the at least one specific content from a second network; and
construct the at least one content from the first part of the at least one specific content from the first network and the second part of the at least one specific content from the second network.

74. The system of claim 73, wherein said temporal address unit configured to receive a request for a substance of data further comprises:
a spatial-to-temporal address converter configured to receive a request for data in a spatial format.

75. The system of claim 74, wherein said spatial-to-temporal address converter configured to receive a request for data in a spatial format further comprises:
a spatial-to-temporal address converter configured to receive a request for data in a spatial address device format.

76. The system of claim 73, wherein said temporal address unit configured to receive a request for a substance of data further comprises:
a content-to-temporal address converter configured to receive a request for data in a content format.

77. The system of claim 76, wherein said content-to-temporal address converter configured to receive a request for data in a content format further comprises:
a content-to-temporal address converter configured to receive a request for at least a part of recorded video.

78. The system of claim 76, wherein said content-to-temporal address converter configured to receive a request for data in a content format further comprises:
a content-to-temporal address converter configured to receive a request for at least a part of recorded audio.

79. The system of claim 76, wherein said content-to-temporal address converter configured to receive a request for data in a content format further comprises:
a content-to-temporal address converter configured to receive a request for at least a part of recorded audio and video.

80. The system of claim 76, wherein said data switch controller configured to generate one or more first-network temporal addresses and second-network temporal addresses in response to the request for the substance further comprises:
said data switch controller configured to access a first-network content transmission schedule and a second-network content transmission schedule.

* * * * *

UNITED STATES PATENT AND TRADEMARK OFFICE
CERTIFICATE OF CORRECTION

| | | |
|---|---|---|
| PATENT NO. | : 7,644,183 B2 | Page 1 of 1 |
| APPLICATION NO. | : 10/734650 | |
| DATED | : January 5, 2010 | |
| INVENTOR(S) | : Hillis et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1656 days.

Signed and Sealed this

Twenty-first Day of December, 2010

David J. Kappos
*Director of the United States Patent and Trademark Office*